US012551876B2

(12) United States Patent
Tait, Jr. et al.

(10) Patent No.: US 12,551,876 B2
(45) Date of Patent: Feb. 17, 2026

(54) COORDINATED PLATINUM HYDROSILYLATION CATALYSTS WITH COOH BASED LIGANDS

(71) Applicant: THE TRUSTEES OF INDIANA UNIVERSITY, Bloomington, IN (US)

(72) Inventors: Steven L. Tait, Jr., Bloomington, IN (US); Iyad Syed Ali, Chesterton, IN (US); Linxiao Chen, Issaquah, WA (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 678 days.

(21) Appl. No.: 17/921,012

(22) PCT Filed: Apr. 29, 2021

(86) PCT No.: PCT/US2021/029782
§ 371 (c)(1),
(2) Date: Oct. 24, 2022

(87) PCT Pub. No.: WO2021/222493
PCT Pub. Date: Nov. 4, 2021

(65) Prior Publication Data
US 2023/0149912 A1     May 18, 2023

Related U.S. Application Data

(60) Provisional application No. 63/017,977, filed on Apr. 30, 2020.

(51) Int. Cl.
*B01J 31/22*     (2006.01)
*B01J 23/10*     (2006.01)
*B01J 31/18*     (2006.01)
*B01J 31/26*     (2006.01)
*C07F 7/18*      (2006.01)

(52) U.S. Cl.
CPC .......... *B01J 31/2239* (2013.01); *B01J 23/10* (2013.01); *B01J 31/1815* (2013.01); *B01J 31/26* (2013.01); *C07F 7/1876* (2013.01); B01J 2231/323 (2013.01); B01J 2235/00 (2024.01); B01J 2235/10 (2024.01); B01J 2235/30 (2024.01); B01J 2531/828 (2013.01)

(58) Field of Classification Search
CPC .................................................. C07F 7/1876
See application file for complete search history.

(56) References Cited

U.S. PATENT DOCUMENTS

| | | | |
|---|---|---|---|
| 3,775,452 A | 11/1973 | Karstedt | |
| 11,471,865 B2 * | 10/2022 | Tait | B01J 37/0209 |
| 11,484,872 B2 * | 11/2022 | Tait | B01J 31/2234 |
| 2009/0247397 A1 * | 10/2009 | Mashima | B01J 23/48 502/171 |
| 2020/0261896 A1 * | 8/2020 | Tait | B01J 31/1815 |
| 2023/0125951 A1 * | 4/2023 | Tait, Jr. | B01J 31/1815 502/167 |

FOREIGN PATENT DOCUMENTS

WO    WO-2007099449 A2 *  9/2007  .......... B01J 37/0207

OTHER PUBLICATIONS

L. Chen et al., 365 Journal of Catalysis, 303-312 (2018) (Year: 2018).*
Chen et al., 365 Journal of Catalysis, 303-312 (2018) (Year: 2018).*
D. Kunwar et al., 9 ACS Catalysis, 3978-3990 (2019) (Year: 2019).*
Z. Zhang et al., 10 Nature Communications, 1-7 (2019) (Year: 2019).*
G. Vilé et al., 54 Angew. Chem. Int. Ed., 11265-11269, (2015) (Year: 2015).*
D. Skomski et al., 134 Journal of the American Chemical Society, 9862-9864 (2014) (Year: 2014).*
L. Chen et al., 11 ChemCatChem, 2843-2854 (2019) (Year: 2019).*
PCT International Search Report and Written Opinion completed by the ISA/US on Jun. 21, 2021 and issued in connection with PCT/US2021/029782.
(Chen, Let al.) Alkene Hydrosilylation on Oxide-Supported Pt-Ligand Single-Site Catalysts. ChemCatChem. Jun. 2019, Epub Apr. 25, 2019, vol. 11, No. 12; pp. 2843-2854.
Sommer, L., et al., Peroxide-catalyzed addition of trichlorosilane to 1-octene. J. Am. Chem. Soc. 1947, 69, 188-188.
Pierce, O.R., et al., Fluorosilicones as high temperature elastomers. J. Elastoplastics, vol. 3, (Apr. 1971), p. 82-96.
Marciniec, B., et al., Organosilicon Chemistry V-From Molecules to Materials. Wiley VCH, Weinheim 2003.—Book Reference.
Morita, Y., et al., Thermally initiated cationic polymerization and properties of epoxy siloxane. J. Appl. Polym. Sci. 2006, 100, 2010-2019.
Beyou, E., et al., New fluorinated polysiloxanes containing an ester function in the spacer. I. Synthesis and characterization. J. Polym. Sci., Part A: Polym. Chem. 1994, 32, 1673-1681.
Iojoiu, C., et al., Synthesis and photocrosslinking of benzyl acrylate substituted polydimethylsiloxanes. Eur. Polym. J. 2000, 36, 2115-2123.
Li, Z., et al., Synthesis and structural characterization of a new polysiloxane with second-order nonlinear optical effect. J. Appl. Polym. Sci. 2004, 94, 769-774.
Sellinger, A., et al., Palladium-and platinum-catalyzed coupling reactions of allyloxy aromatics with hydridosilanes and hydridosiloxanes: Novel liquid crystalline/organosilane materials. J. Polym. Sci., Part A: Polym. Chem. 1994, 32, 3069-3089.
Drazkowski, D.B., et al., Chemical substituent effects on morphological transitions in styrene-butadiene-styrene triblock copolymer grafted with polyhedral oligomeric silsesquioxanes. Macromolecules 2006, 39, 1854-1863.

(Continued)

*Primary Examiner* — Alexander R Pagano
(74) *Attorney, Agent, or Firm* — Barnes & Thornburg LLP

(57) ABSTRACT

The invention describes metal catalysts such as Pt single-site centers on metal oxide supports, e.g., powdered supports, such as MgO, $Al_2O_3$, $CeO_2$ or mixtures thereof with phenyl or biphenyl ligands substituted with two or more carboxylic acid groups.

20 Claims, 15 Drawing Sheets

(56) References Cited

OTHER PUBLICATIONS

Tuchbreiter, A., et al., "A posteriori" modification of carbosilane dendrimers and dendrons: their activation in core and branch positions. Dalton Trans. 2005, 1394-1402.

Troegel, D., et al., Recent advances and actual challenges in late transition metal catalyzed hydrosilylation of olefins from an industrial point of view. Coord. Chem. Rev. 2011, 255, 1440-1459.

Jerschow, P., Silicone elastomers; Smart Publications, 2001; vol. 137.—Book Reference.

Morris, R. H., Asymmetric hydrogenation, transfer hydrogenation and hydrosilylation of ketones catalyzed by iron complexes. Chem. Soc. Rev. 2009, 38, 2282-2291.

Langlotz, B. K., et al., Chiral bis (pyridylimino) isoindoles: A highly modular class of pincer ligands for enantioselective catalysis. Angew. Chem. Int. Ed. 2008, 47, 4670-4674. In Angew. Chem. 2008, 120, 4748-4752.

Bart, S. C., et al., Preparation and molecular and electronic structures of iron (0) dinitrogen and silane complexes and their application to catalytic hydrogenation and hydrosilation. J. Am. Chem. Soc. 2004, 126, 13794-13807.

Vankelecom, I., et al., Dense organic catalytic membranes for fine chemical synthesis. Catal. Today 2000, 56, 147-157. QD501 .C35 v.55-56 2000 B-ALF BTAA Print Archive (requested Oct. 31 1:13).

Xue, M., et al., Effect of triarylphosphane ligands on the rhodium-catalyzed hydrosilylation of alkene. Appl. Organomet. Chem. 2014, 28, 120-126.

Igarashi, M., et al., Ir-catalyzed hydrosilylation reaction of allyl acetate with octakis (dimethylsiloxy) octasilsesquioxane and related hydrosilanes. J. Organomet. Chem. 2014, 752, 141-146.

Dong, H., et al., Rhenium-mediated dehydrogenative silylation and highly regioselective hydrosilylation of nitrile substituted olefins. J. Organomet. Chem. 2014, 750, 17-22.

Wu, J. Y., et al., A strategy for the synthesis of well-defined iron catalysts and application to regioselective diene hydrosilylation. J. Am. Chem. Soc. 2010, 132, 13214-13216.

Glaser, P.B., et al., Catalytic hydrosilylation of alkenes by a ruthenium silylene complex. Evidence for a new hydrosilylation mechanism. J. Am. Chem. Soc. 2003, 125, 13640-13641.

Nozakura, S., et al., Cyanoethylation of Trichlorosilane. II. α-Addition. Bull. Chem. Soc. Jpn. 1956, 29, 326-331.

Bareille, L., et al., First Titanium-Catalyzed anti-1, 4-Hydrosilylation of Dienes. Organometallics 2005, 24, 5802-5806.

Harder, S., et al., Rational Design of a Well-Defined Soluble Calcium Hydride Complex. Angew. Chem. Int. Ed. 2006, 45, 3474-3478.

Speier, J.L., et al., The addition of silicon hydrides to olefinic double bonds. Part II. The use of group VIII metal catalysts. J. Am. Chem. Soc. 1957, 79, 974-979.

Galeandro-Diamant, T., et al., Platinum nanoparticles in suspension are as efficient as Karstedt's complex for alkene hydrosilylation. Chem. Commun. 2015, 51, 16194-16196.

Chauhan, B.P., et al., Regioselective Synthesis of Multifunctional Hybrid Polysiloxanes Achieved by Pt-Nanocluster Catalysis. J. Am. Chem. Soc. 2005, 127, 5790-5791.

Bai, Y., et al., Use of functionalized PEG with 4-aminobenzoic acid stabilized platinum nanoparticles as an efficient catalyst for the hydrosilylation of alkenes. J. Colloid Interface Sci. 2013, 394, 428-433.

Stein, J., et al., In situ determination of the active catalyst in hydrosilylation reactions using highly reactive Pt (0) catalyst precursors. J. Am. Chem. Soc. 1999, 121, 3693-3703.

Meister, T.K., et al., Platinum Catalysis Revisited—Unraveling Principles of Catalytic Olefin Hydrosilylation. ACS Catal. 2016, 6, 1274-1284.

Markó, I. E., et al., Selective and efficient platinum (0)-carbene complexes as hydrosilylation catalysts. Science 2002, 298, 204-206.

Markó, I. E., et al., Highly Active and Selective Platinum(0)-Carbene Complexes. Efficient, Catalytic Hydrosilylation of Functionalised Olefins. Adv. Synth. Catal. 2004, 346, 1429-1434.

Bernhammer, J. C., et al., Platinum (II) complexes with thioether-functionalized benzimidazolin-2-ylidene ligands: Synthesis, structural characterization, and application in hydroelementation reactions. Organometallics 2013, 33, 172-180.

Dunsford, J.J., et al., Expanded ring N-heterocyclic carbene complexes of zero valent platinum dvtms (divinyltetramethyldisiloxane): Highly efficient hydrosilylation catalysts. J. Organomet. Chem. 2011, 696, 188-194.

Taige, M.A., et al., Platinum (II)-bis-(N-heterocyclic carbene) complexes: synthesis, structure and catalytic activity in the hydrosilylation of alkenes. J. Organomet. Chem. 2011, 696, 2918-2927.

Sabourault, N., et al., Platinum oxide ($PtO_2$): a potent hydrosilylation catalyst. Org. Lett. 2002, 4, 2117-2119.

Chen, Y.J., et al., Discovering Partially Charged Single-Atom Pt for Enhanced Anti-Markovnikov Alkene Hydrosilylation. J. Am. Chem. Soc. 2018, 140, 7407-7410.

Zhu, Y., et al., One-Pot Pyrolysis to N-Doped Graphene with High-Density Pt Single Atomic Sites as Heterogeneous Catalyst for Alkene Hydrosilylation. ACS Catal. 2018, 8, 10004-10011.

Cui, X., et al., Synthesis of Single Atom Based Heterogeneous Platinum Catalysts: High Selectivity and Activity for Hydrosilylation Reactions. ACS Central Science 2017, 3, 580-585.

Huang, Z., et al., Catalytically Active Single-Atom Sites Fabricated from Silver Particles. Angew. Chem. 2012, 124, 4274-4279.

Fako, E.; Lodziana, Z.; Lopez, N., Comparative single atom heterogeneous catalysts (SAHCs) on different platforms: a theoretical approach. Catal. Sci. Technol. 2017, 7, 4285-4293.

Chen, Y.X., et al., Fabrication, characterization, and stability of supported single-atom catalysts. Catalysis Science & Technology 2017, 7, 4250-4258.

Vilé, G., et al., A Stable Single-Site Palladium Catalyst for Hydrogenations. Angew. Chem. Int. Ed. 2015, 54, 11265-11269.

Xu, W., et al., Single-site SBA-15 supported zirconium catalysts. Synthesis, characterization and toward cyanosilylation reaction Single-site SBA-15 supported zirconium catalysts. Synthesis, characterization and toward cyanosilylation reaction. Appl. Surf. Sci. 2015, 325, 227-234.

Ji, P., et al., Single-Site Cobalt Catalysts at New Zr8 (μ2-0)8 (μ2-OH)4 Metal-Organic Framework Nodes for Highly Active Hydrogenation of Alkenes, Imines, Carbonyls, and Heterocycles. J. Am. Chem. Soc. 2016, 138, 12234-12242.

Schweitzer, N.M., et al., Propylene Hydrogenation and Propane Dehydrogenation by a Single-Site Zn2+ on Silica Catalyst. ACS Catal. 2014, 4, 1091-1098.

Sohn, H., et al., Isolated, well-defined organovanadium (III) on silica: single-site catalyst for hydrogenation of alkenes and alkynes. Chem. Commun. 2017.

Skomski, D., et al., Two- and Three-Electron Oxidation of Single-Site Vanadium Centers at Surfaces by Ligand Design. J. Am. Chem. Soc. 2015, 137, 7898-7902.

Skomski, D., et al., Redox-active on-surface polymerization of single-site divalent cations from pure metals by a ketone-functionalized phenanthroline. J. Chem. Phys. 2015, 142, 101913.

Skomski, D., et al., Redox-Active On-Surface Assembly of Metal-Organic Chains with Single-Site Pt(II). J. Am. Chem. Soc. 2014, 136, 9862-9865.

Tempas, C.D., et al., Redox Isomeric Surface Structures Are Preferred over Odd-Electron Pt1+. Chem. Eur. J. 2018, 24, 15852-15858.

Williams, C.G., et al., Metal-Ligand Complexation through Redox Assembly at Surfaces Characterized by Vibrational Spectroscopy. J. Phys. Chem. C 2017.

Morris, T.W., et al., Multi-electron Reduction Capacity and Multiple Binding Pockets in Metal-Organic Redox Assembly at Surfaces. Chem. Eur. J. 2019, 25, 5565-5573.

Chen, L., et al., Synthesis of platinum single-site centers through metal-ligand self-assembly on powdered metal oxide supports. J. Catal. 2018, 365, 303-312.

Chen, L., et al., Alkene Hydrosilylation on Oxide-Supported Pt-Ligand Single-Site Catalysts. ChemCatChem 2019, 11, 2843-2854.

Chen, L., et al., Sulfate promotion of selective catalytic reduction of nitric oxide by ammonia on ceria. Catalysis Science & Technology 2019, 9, 1802-1815.

(56) References Cited

OTHER PUBLICATIONS

Iimura, T., et al., A Dialkylsilylene-Pt(0) Complex with a DVTMS Ligand for the Catalytic Hydrosilylation of Functional Olefins, Organometallics, 35 (2016) 4071-4076.

Chen, L., et al., Bidentate N-based Ligands for Highly Reusable, Ligand-coordinated, Supported Pt Hydrosilylation Catalysts, ChemCatChem, 12 (2020) 3576-3584. Accepted Article, DOI: 10.1002/cctc.202000085.

Tait, S.L., et al., Metal-Organic Coordination Interactions in Fe-Terephthalic Acid Networks on Cu(100), J. Am. Chem. Soc., 130 (2008) 2108-2113.

Skomski, D., et al., Robust Surface Nano-Architecture by Alkali-Carboxylate Ionic Bonding, Journal of the American Chemical Society, 134 (2012) 14165-14171.

Ozer, D., et al., Synthesis and Characterization of Boric Acid Mediated Metal-organic Frameworks Based on Trimesic Acid and Terephthalic Acid, Journal of Molecular Structure, 1141 (2017) 261-267.

Stepanow, S., et al., Deprotonation-Driven Phase Transformations in Terephthalic Acid Self-Assembly on Cu(100), J. Phys. Chem. B, 108 (2004) 19392-19397.

Burns, F., et al., X-ray photoelectron spectroscopy of cadmium arachidate monolayers on various metal surfaces, J. Phys. Chem., 86 (1982) 5123-5127.

Russat, J., Characterization of polyamic acid/polyimide films in the nanometric thickness range from spin-deposited polyamic acid, Surf. Interface Anal., 11 (1988) 414-420.

Troughton, E.B., et al., Monolayer films prepared by the spontaneous self-assembly of symmetrical and unsymmetrical dialkyl sulfides from solution onto gold substrates: structure, properties, and reactivity of constituent functional groups, Langmuir, 4 (1988) 365-385.

Taguchi, M., et al., Supercritical hydrothermal synthesis of hydrophilic polymer-modified water-dispersible $CeO_2$ nanoparticles, CrystEngComm, 13 (2011) 2841-2848.

Cheng, G., et al., Preparation of P(St-co-MAA)/$CeO_2$ composite microspheres via surface carboxyl oxidation followed by in situ chemical deposition of $CeO_2$ and their catalytic application on oxidative degradation of methyl orange, RSC Adv., 4 (2014) 29042-29049.

Taguchi, M., et al., Growth Mechanism and Surface Chemical Characteristics of Dicarboxylic Acid-Modified $CeO_2$ Nanocrystals Produced in Supercritical Water: Tailor-Made Water-Soluble $CeO_2$ Nanocrystals, Cryst. Growth Des., 9 (2009) 5297-5303.

Schmidt, J.J., et al., Surface studies of polymer blends. 2. An ESCA and IR study of poly (methyl methacrylate)/poly (vinyl chloride) homopolymer blends, Macromolecules, 22 (1989) 4489-4495.

Onishi, H., et al., Adsorption of Na atoms and oxygen-containing molecules on MgO(100) and (111) surfaces, Surf. Sci., 191 (1987) 479-491.

Kallury, K.M.R., et al., Covalent binding of amino, carboxy, and nitro-substituted aminopropyltriethoxysilanes to oxidized silicon surfaces and their interaction with octadecanamine and octadecanoic acid studied by X-ray photoelectron spectroscopy and ellipsometry, J. Adhes. Sci. Technol., 5 (1991) 801-814. TN:2145099—OCLC.

Pakharukova, V.P.,, et al., Alumina-supported platinum catalysts: Local atomic structure and catalytic activity for complete methane oxidation, Appl. Catal. A, 486 (2014) 12-18.

Beck, I.E., et al., Platinum nanoparticles on $Al2O3$: Correlation between the particle size and activity in total methane oxidation, J. Catal., 268 (2009) 60-67.

Leich, V., et al., Hydrosilylation catalysis by an earth alkaline metal silyl; synthesis, characterization, and reactivity of pis (triphenylsilyl) calcium, Chem. Commun. 2014, 50, 2311-2314.

* cited by examiner

COORDINATED PLATINUM HYDROSILYLATION CATALYSTS WITH COOH BASED LIGANDS

CROSS REFERENCE TO RELATED APPLICATIONS

This application is a U.S. National counterpart application of international application serial No. PCT/US2021/029782 filed Apr. 29, 2021, which claims priority to U.S. Provisional Patent Application No. 63/017,977 filed on Apr. 30, 2020, the disclosures of which are hereby expressly incorporated by reference in their entireties.

STATEMENT OF GOVERNMENT RIGHTS

This invention was made with government support under Department of Energy awarded by the DE-SC0016367. The government has certain rights in the invention.

FIELD OF THE INVENTION

The invention relates generally to metal catalysts such as Pt single-site centers on metal oxide supports, e.g., powdered supports, such as MgO, $Al_2O_3$, $CeO_2$ or mixtures thereof with phenyl or biphenyl ligands substituted with two or more carboxylic acid groups.

BACKGROUND OF THE INVENTION

Hydrosilylation, the addition of a Si—H bond to a multiple bond (particularly C=C, Scheme 1), has been of significant industrial importance since its first report in 1947 [1] to produce functionalized silicon-based polymers with various applications [2-10]. It also offers solutions to silicone curing [11, 12] and Si—C bond building in fine chemical synthesis [13-16]. Homogeneous Pt catalysts, exemplified by Speier ($H_2PtCl_6$/$^iPr$—OH [17]) and Karstedt (a vinyl-siloxane $Pt^0$ [18]) catalysts, have long prevailed as industrial catalysts because of the far superior activity of Pt over other metals (TON (turn over number)>1000000) [19-28]. Despite high activity, these catalysts suffer from eventual deactivation caused by Pt aggregation [11, 29-33] and side reactions (Scheme 1).

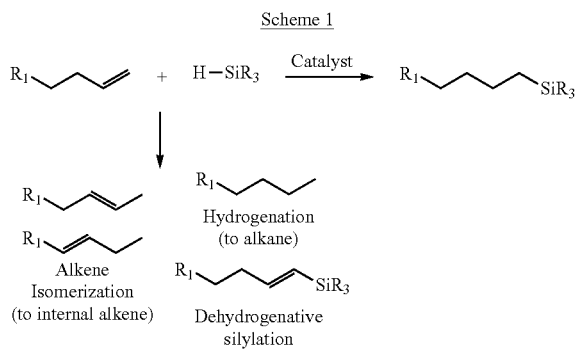

Scheme 1

Besides, the high cost and uncertainty of future Pt supply demand more active and durable catalysts for more efficient Pt utilization. To achieve these aims, Pt complexes with updated ligand design, e.g., Pt-carbene complexes [34-38], have been developed. Heterogeneous Pt catalysts have also been explored due to the desired easy separation and recovery from soluble reactants/products [29-31, 39-42].

Therefore, a need exists for catalysts and processes that overcome one or more of the current disadvantages noted above.

BRIEF SUMMARY OF THE INVENTION

The recent popularity of immobilized organometallic catalysts and single-atom catalysts (SACs) is indicative of the broad goal to achieve high metal utilization efficiency and selectivity of homogeneous catalysts in the easily separable solid form [43-50]. Since these desired characters would bring solutions to aforementioned challenges in hydrosilylation, Pt SACs have generated interest for the reaction, showing >300000 TON [40-42]. Therefore, Pt ligand-coordinated supported catalysts (LCSCs) [51-53] have been developed through a novel metal-ligand coordination strategy, which was initially developed in experiments on flat, pristine model surfaces [54-59]. A series of bidentate N-based ligands with favored metal binding pockets and electron-accepting potentials, such as 3,6-Di-2-pyridyl-1,2,4,5-tetrazine (DPTZ), were applied to stabilize highly (in some cases, atomically) dispersed Pt cations on oxide supports [51, 60].

These hydrosilylation catalysts exhibit improvements over commercial catalysts, supported Pt particles, and other Pt SACs in crucial aspects, but are limited by poor reusability due to active site leaching [52]. Besides effectively maintaining high Pt dispersion, the ligand also allows fine-tuning Pt sites, introducing another desired feature of homogeneous catalysts to heterogeneous catalysis. Consequently, the vast potential of the organic ligand space was taken advantage of, to improve the performance of Pt LCSCs.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

BRIEF DESCRIPTION OF THE DRAWINGS

FIG. 9a-c shows structures of ligands 3,6-di-2-pyridyl-1,2,4,5-tetrazine (DPTZ), 1,10-phenanthroline-5,6-dione (PDO), and bis-pyrimidyltetrazine (BMTZ).

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Ligand-coordinated supported catalysts (LCSCs) with highly-dispersed metal centers are of growing interest to bring the high selectivity and metal utilization efficiency of isolated, well-defined metal centers to a solid support for recyclability and long-term stability. Metal-ligand complexation with bidentate N-based ligands in LCSCs have shown high activity, selectivity, and stability in hydrosilylation catalysis. Herein a new series of carboxylic acid-based ligands to tune the LCSCs in two ways: as "anchoring ligand" to improve stability or to tune the character of the metal center. Both strategies create active and selective Pt catalysts for 1-octene hydrosilylation. These LCSCs show no noticeable deactivation through multiple batches and high activity at near room temperature, which are both significant improvements. In addition to improving activity and reusability of Pt hydrosilylation LCSCs, this work also expands the ligand pool for creating highly-dispersed metal centers through on-surface metal-ligand complexation, providing examples of tuning properties of LCSCs via ligand design.

Figure 1:
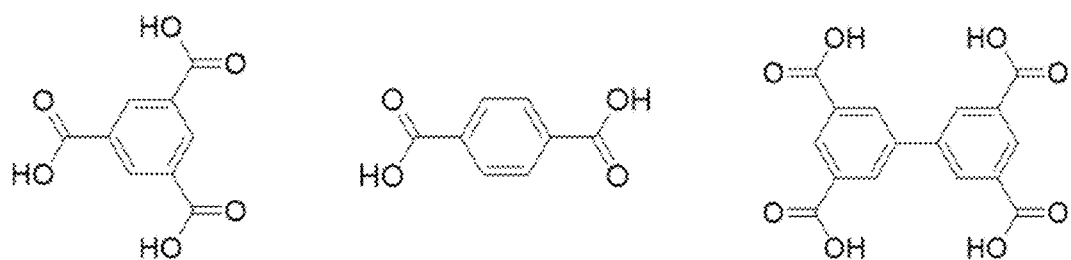
FIG. 1 depicts structures of —COOH-based ligands used in this work. From left to right: trimesic acid (TMA), terephthalic acid (TPA), and biphenyl-3,3',5,5'-tetracarboxylic acid (BTA).
Figure 2:
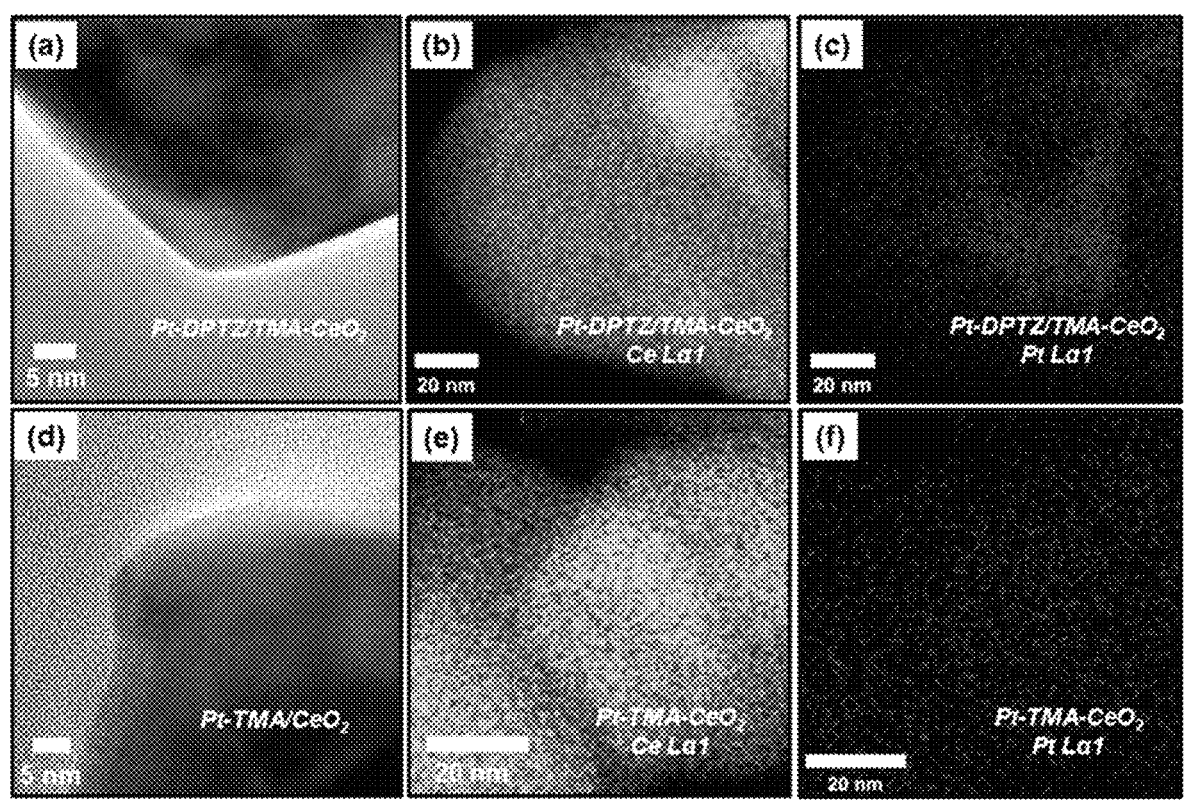
FIG. 2 provides TEM images of (a) Pt-DPTZ/TMA-$CeO_2$ and (d) Pt-TMA/$CeO_2$ showing the absence of visible Pt clusters or particles. EDX mapping of Pt-DPTZ/TMA-$CeO_2$ for (b) Ce Lα1 and (c) Pt Lα1 and of Pt-TMA/$CeO_2$ for (e) Ce Lα1 and (f) Pt Lα1 showing the uniform distribution of Pt.

A group of —COOH-based ligands (FIG. 2): trimesic acid (TMA), terephthalic acid (TPA), and biphenyl-3,3',5,5'-tetracarboxylic acid (BTA), for $CeO_2$-supported Pt LCSCs were examined. Carboxylic acid-based ligands differ vastly from the N-based ligands previously used. For example, N-based ligands have electron-accepting potential at its bidentate N binding pocket. Conversely, —COOH-based ligands are electron-rich and offer a much different coordination environment to Pt. Studies have shown that terephthalic acid (TPA) exists predominantly in its negatively charged, deprotonated form when self-assembling on Cs and Cu surfaces [61, 62]. The anionic carboxylate group offers a strong interaction with cationic Pt centers to stabilize the catalyst complex. Additionally, —COOH-based ligands have been shown to be effective in both metal-organic framework (MOF) synthesis [63] and in forming regular self-assemblies at surfaces [64]. It was previously hypothesized that the formation of similar Pt-DPTZ complex chain structures, indicating these ligands may be able to match or improve upon the catalytic characteristics of Pt-DPTZ.

Described herein, it is demonstrated that the —COOH-based ligands successfully create active and selective Pt hydrosilylation LCSCs with highly dispersed Pt cations on $CeO_2$. TMA, when deposited onto $CeO_2$ as the "anchoring ligand," can mitigate the active site leaching on Pt-DPTZ LCSC and thus improve its reusability. Next, case-by-case comparisons on TMA, TPA, and BTA as the Pt coordination ligand are offered, demonstrating the strong ligand effects, and activity enhancement over bidentate N-based ligand catalysts. Detailed XPS studies provide insights into how Pt and ligands evolve during catalysis, as well as principles differentiating behaviors of —COOH— and bidentate N-based ligands. Overall, this study provides both a new family of ligands that steer performance of Pt hydrosilylation LCSCs towards desired directions and understanding to inspire future ligand design.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 17 provide for various aspects of the present embodiments. In one embodiment, in a first paragraph (1), a supported platinum catalyst system comprising: (a) a multi-carboxylic acid phenyl or biphenyl ligand to complex with (b) a platinum metal ion and (c) a support is described.

2. The supported platinum catalyst system of paragraph 1, wherein the multi-carboxylic acid phenyl or biphenyl ligand has at least two carboxylic acid groups.

3. The supported platinum catalyst system of paragraph 2, wherein the at least two carboxylic acid groups are positioned meta or para to each other about the phenyl or biphenyl ring.

4. The supported platinum catalyst of any of paragraphs 1 through 3, wherein the multi-carboxylic acid phenyl or biphenyl ligand comprises one of the formulae:

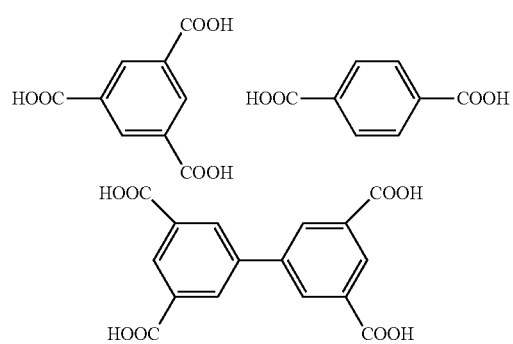

or mixtures thereof.

5. The supported platinum catalyst system of any of paragraphs 1 through 4, wherein the support comprises MgO, $Al_2O_3$, $CeO_2$ or mixtures thereof.

6. A process comprising:
(a) providing a supported catalyst system of any of paragraphs 1 through 5;
(b) contacting the supported catalyst system, a vinyl terminated alkene and a hydrosilylation agent under hydrosilylation conditions; and
(c) hydrosilylating the vinyl terminated alkene to form a hydrosilylated alkyl product.

7. The process of paragraph 6, wherein the support comprises MgO, $Al_2O_3$, $CeO_2$ or mixtures thereof.

8. The process of either paragraphs 6 or 7, wherein the vinyl terminated alkene is 1-octene 9. The process of any of paragraphs 6 through 8, wherein the hydrosilylation agent comprises dimethoxymethylsilane.

10. A supported platinum catalyst system comprising: (a) an anchoring ligand comprising a multi-carboxylic acid phenyl or biphenyl ligand, (b) a platinum metal ion, (c) a support and (d) 3,6-di-2-pyridyl-1,2,4,5-tetrazine (DPTZ).

11. The supported platinum catalyst system of paragraph 10, wherein the anchoring ligand multi-carboxylic acid phenyl or biphenyl ligand has at least two carboxylic acid groups.

12. The supported platinum catalyst system of paragraph 11, wherein the at least two carboxylic acid groups are positioned meta or para to each other about the phenyl or biphenyl ring.

13. The supported platinum catalyst of any of paragraph 10, wherein the anchoring ligand multi-carboxylic acid phenyl or biphenyl ligand comprises one of the formulae:

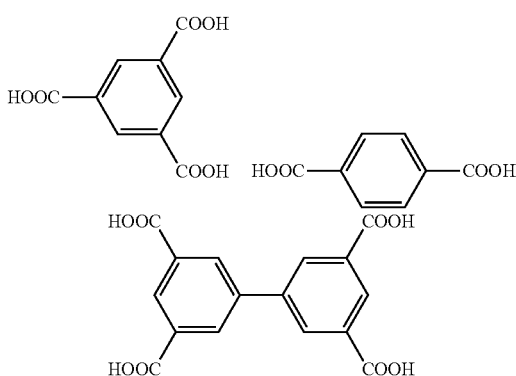

or mixtures thereof.
14. The supported platinum catalyst system of any of paragraphs 10 through 13, wherein the support comprises MgO, $Al_2O_3$, $CeO_2$ or mixtures thereof.
15. A process comprising:
 (a) providing a supported catalyst system of any of paragraph 14;
 (b) contacting the supported catalyst system, a vinyl terminated alkene and a hydrosilylation agent under hydrosilylation conditions; and
 (c) hydrosilylating the vinyl terminated alkene to form a hydrosilylated alkyl product.
16. The process of paragraph 15, wherein the vinyl terminated alkene is 1-octene
17. The process of paragraph 15, wherein the hydrosilylation agent comprises dimethoxymethylsilane.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

2. Examples

2.1 Synthesis of Supported Coordinated Pt Catalysts

The synthesis of Pt-TMA/$CeO_2$, Pt-TPA/$CeO_2$, and Pt-BTA/$CeO_2$ follows the one-step impregnation method reported previously [51, 52]. For Pt-TMA/$CeO_2$: 0.0096 g (0.046 mol) TMA (Sigma Aldrich, 95%) were completely dissolved in 25 mL 1-butanol (Alfa Aesar, 99%) by stirring for 20 min at room temperature. 0.3 g $CeO_2$ (BET surface area: 4.8 $m^2$/g) were added to the TMA solution and the mixture was then stirred for 2 h at room temperature. 0.0080 g $H_2PtCl_6 \cdot 6H_2O$ (Alfa Aesar, 99.95% metal basis, 0.015 mol, 1 wt % by Pt; 3 eq. TMA with Pt) were dissolved in 5 mL 1-butanol, and then added to the $CeO_2$/TMA/1-butanol mixture dropwise under stirring within 30 min. The mixture was covered and stirred for 24 h, dried at room temperature under dry air flow, and washed with first water, then dichloromethane (DCM) to remove free Pt and TMA. For Pt-TMA/$CeO_2$-1/5, the amount of $H_2PtCl_6 \cdot 6H_2O$ was reduced to 0.0016 g. For Pt-TPA/$CeO_2$ and Pt-BTA/$CeO_2$, TMA was replaced by TPA (Aldrich, 98%) and BTA (Aldrich), respectively. DMF (Macron, ACS Grade) was used instead of 1-butanol as the solvent in the case of TPA. For Pt-DPTZ/TMA-$CeO_2$, 0.07 mmol TMA was impregnated onto 0.5 g $CeO_2$ in 1-butanol in a separate first step, following a previous report [65]. The TMA-modified $CeO_2$ was then used instead of pristine $CeO_2$ in the procedure described previously for Pt-DPTZ/$CeO_2$ synthesis [51]. Pt-TMA/$CeO_2$, Pt-TPA/$CeO_2$, and Pt-DPTZ/TMA-$CeO_2$ were yellow powders, and Pt-BTA/$CeO_2$ were light grey powders.

2.2 General Procedures for Alkene Hydrosilylation Reactions.

30 mg Pt LCSCs were weighed and kept in an empty reaction tube with a cap. In most reactions, 5 mmol dimethoxymethylsilane (Alfa Aesar, >97%) and 6 mmol 1-octene (Alfa Aesar, >97%) were weighed into another reaction tube, and 3 mL toluene (Macron, ACS grade) was added to the same tube, except for in 60° C., 20 min reactions, the amount of all chemicals was reduced to half. Both tubes were pre-heated in a water bath at the reaction temperature (40° C. to 70° C.) for 10 min, before reactants and solvent were added into the tube with Pt catalysts. The tube was capped during the reaction to avoid silane evaporation. After the reaction, the tube was cooled down quickly with cold water flow, the solid catalysts were centrifuged out for reuse or characterization, and the solution was diluted to 25 mL for GC-MS measurements with an Agilent 6890N Gas Chromatograph and 5973 Inert Mass Selective Detector. Product yield was calculated based on its response intensity at m/z=203.2 with respect to the response of internal standard decane (Sigma Aldrich, >99%, ~0.15 g added to each solution) at m/z=142.2. The detailed information about calibration curves can be found in previous publications [52, 60].

2.3 Characterization of Supported Coordinated Pt Catalysts.

X-ray photoemission spectroscopy (XPS) measurements were performed with a PHI Versaprobe II XP spectrometer using a monochromated Al X-ray source. A small amount of each powder sample was fixed onto a platen with double-sided tape. XPS were collected at Pt 4f, N 1s, C 1s, Cl 2p, Ce 3d, and O 1s regions. A neutralizer was used to alleviate surface charging. The binding energy was corrected with adventitious C 1s peak (284.8 eV). Inductively coupled plasma mass spectrometry (ICP-MS) measurements were performed with an Agilent 7700 quadrupole ICP-MS instrument. Solid samples were treated with aqua regia to dissolve all Pt.

Samples for transmission electron microscopy (TEM) were prepared by drop-casting catalysts dispersed in ethanol onto ultrathin lacey carbon TEM grids. TEM analysis was performed on JEOL JEM 3200FS operating at 300 kV. IR spectroscopy was performed with a diffuse reflectance IR environmental chamber (PIKE Technologies, 162-4160, HTV) at room temperature under air. Background spectra were collected with pristine $CeO_2$. Each IR spectrum was an average of 500 scans and was converted into Kubelka-Munk units.

3. Results and Discussions

Figure 9:
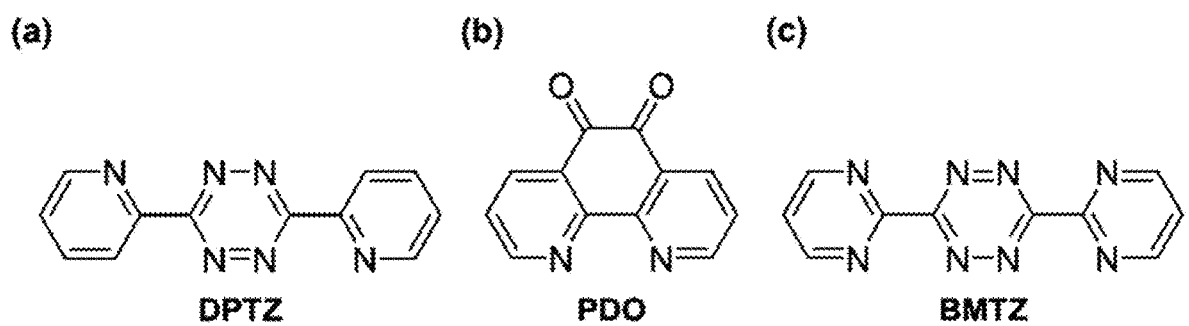
FIG. 9 provides structures from previous bidentate N-based supported coordinated Pt hydrosilylation catalysts.
Figure 9D:
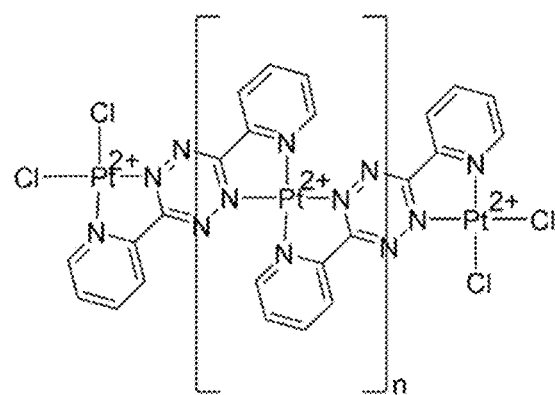
FIG. 9(d) shows the proposed structure of Pt-DPTZ/CeO$_2$ catalyst, based on EXAFS fittings in FIG. 9e and other characterization techniques, in which Pt exist principally as single-atoms with +2 oxidation state, coordinated with N from DPTZ, Cl from Pt precursor, and O from CeO$_2$.
Figure 9E:
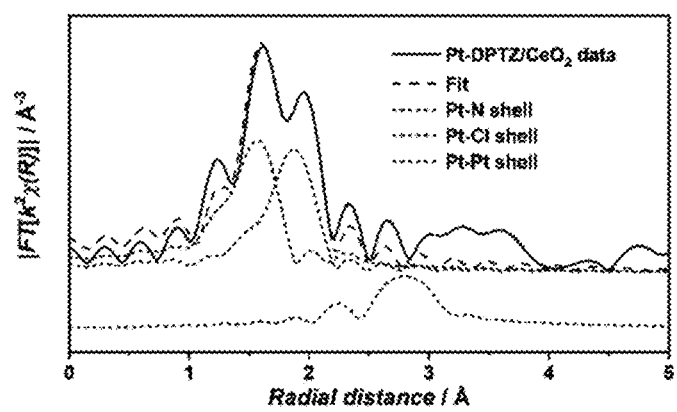
FIG. 9e provides fourier transform magnitudes of EXAFS spectra and its first shell fitting of previous bidentate N-based supported coordinated Pt hydrosilylation catalyst, Pt-DPTZ/CeO2. The fitting shown in this graph was obtained using Pt—N and Pt—Cl paths. The Pt—Pt path is not included in the fitting, but is shown at the bottom of the figure for comparison.

3.1. Catalyst Synthesis, Characterization, and General Remarks on Hydrosilylation Reaction $CeO_2$ was chosen as the support because previous studies suggest that it produces the most active Pt LCSCs [51]. Pt LCSCs were synthesized with two methods. For Pt-DPTZ/TMA-$CeO_2$, pristine $CeO_2$ was first modified with TMA (TMA/$CeO_2$). Then, in a separate step, the previously reported recipe was followed to create Pt-DPTZ LCSCs (see FIG. 9 for the proposed structure) on TMA/$CeO_2$ in 1-butanol [51]. For Pt-TMA/$CeO_2$, Pt-TPA/$CeO_2$, and Pt-BTA/

$CeO_2$, each —COOH-based ligand was impregnated onto $CeO_2$ with Pt precursor simultaneously (see Section 2 for details). For all catalysts, 1 wt % Pt was added to the solution, and the actual Pt loading was determined by ICP-MS, which varies between 0.10% and 0.54% (Table 1). Since Pt-DPTZ/TMA-$CeO_2$ and Pt-TMA/$CeO_2$ show most interesting catalytic properties, the characterization below is more thorough on the two samples than others.

TABLE 1

Synthesis and characterization of fresh Pt LCSCs on $CeO_2$.

| | ICP Pt loading (wt %) | Pt $4f_{7/2}$ BE (eV) | —COOH:Pt[a] | Cl:Pt[b] | Solvent |
|---|---|---|---|---|---|
| Pt-DPTZ/TMA-$CeO_2$ | 0.54 | 72.9 | 5 | 0.7 | 1-butanol |
| Pt-TMA/$CeO_2$ | 0.18 | 72.4 | 19 | 0.3 | 1-butanol |
| Pt-TPA/$CeO_2$ | 0.10 | 72.9 | 34 | 1.2 | DMF |
| Pt-BTA/$CeO_2$ | 0.44 | 72.0 | 5 | 0.1 | 1-butanol |

[a]—COOH:Pt values were calculated based on XPS peak areas of the −288.8 eV component in C 1s region and the and the Pt 4f region.
[b]Cl:Pt values were calculated based on XPS peak areas in Cl 2p and the Pt 4f regions.

Figure 10:
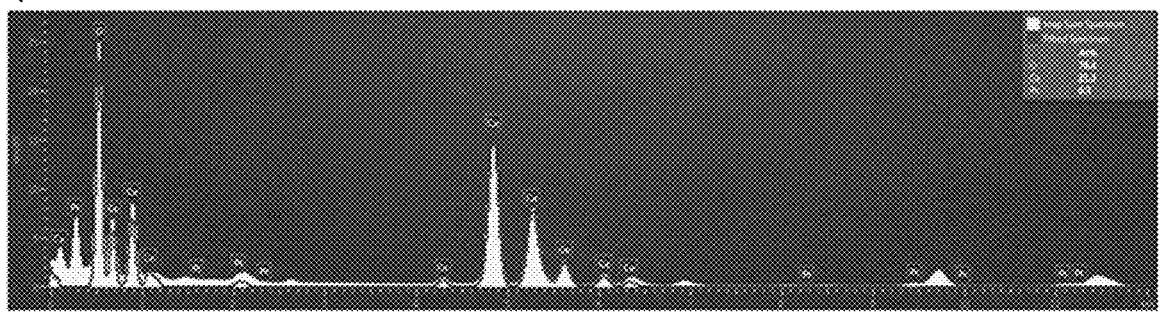
FIG. 10 provides EDX elemental analysis on (a) Pt-DPTZ/TMA-CeO$_2$ and (b) Pt-TMA/CeO$_2$.
Figure 10:
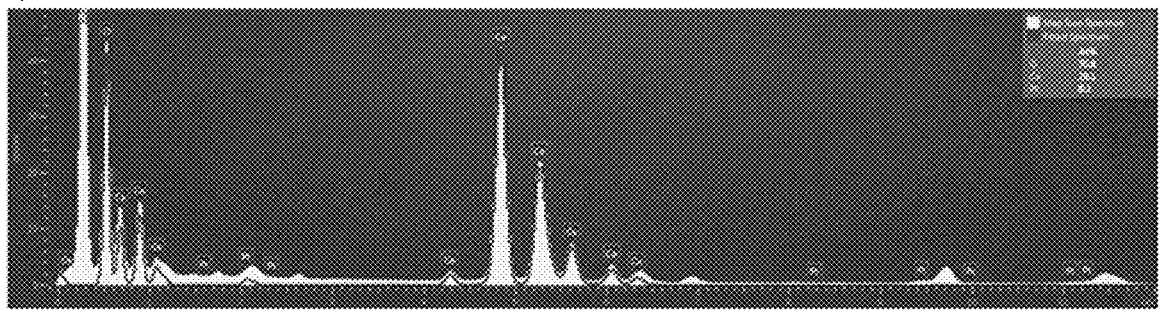

Transmission electronic microscopy (TEM) shows that Pt on Pt-DPTZ/TMA-$CeO_2$ and Pt-TMA/$CeO_2$ are highly, likely atomically, dispersed. No Pt clusters or particles are observed on either sample (FIGS. 2a and 2d). Energy-dispersive X-ray spectroscopy (EDX) confirms the presence of Pt (FIG. 10), while the elemental mapping shows that Pt are uniformly distributed on $CeO_2$ surfaces without forming visible aggregates (FIGS. 2(c) and 2(f)). The high Pt dispersion on fresh catalysts is also supported by X-ray photoelectron spectra (XPS) in the Pt 4f region; Table 1 and FIG. 3(a) exhibit that the binding energy (BE) of Pt $4f_{7/2}$ peak on all fresh catalysts is obviously higher than $Pt^0$ (~70.8 eV) and close to $Pt^{2+}$ (~72.9 eV), and peak fittings do not show any $Pt^0$ species. These results suggest that despite Pt being reduced from the +4 oxidation state in the precursor ($H_2PtCl_6 \cdot 6H_2O$), the formation of metallic nanoparticles is prohibited, i.e., Pt maintain high dispersion. It has been reported that bidentate N-based ligands stabilize atomically dispersed Pt, creating uniform $Pt^{2+}$ species on various supports [51, 52, 54-59]. In comparison, two of the four catalysts, Pt-TMA/$CeO_2$ and Pt-BTA/$CeO_2$ show slightly lower Pt $4f_{7/2}$ BE than $Pt^{2+}$ (Table 1), and fittings reveal the presence of a $Pt^{(2+\delta)+}$ species at ~71.9 eV (FIG. 3(a), see immediately below for details about the fitting method). This implies that the two ligands, when used to coordinate with Pt, do not stabilize $Pt^{2+}$ in the same way as bidentate N-ligands, due to the different coordination environments, leading to a fraction of Pt atoms being slightly more reduced. Nevertheless, they still successfully prevent the formation of $Pt^0$ aggregates, as proved by both XPS and TEM.

Fittings were performed to Pt 4f XPS peaks to deconvolute various Pt oxidation states. Pt has three common oxidation states: +4 (74.8 eV for Pt $4f_{7/2}$ peak), +2 (~72.8 eV), and 0 (~70.9 eV) [S1-3]. Therefore, all fittings were started from these three components. Each component includes a pair of peaks with fixed binding energy separation (3.2 eV) and $4f_{7/2}$:$4f_{5/2}$ area ratio. The FWHM (full width at half maximum) of all peaks were set to be identical. It was found that Pt-TPA/$CeO_2$, and most catalysts using bidentate N-based ligands can be described with a single $Pt^{2+}$ component with FWHM≈2.1 eV [S4, 5], so the FWHM of all peaks was fixed to be around this value. For some samples in this work, the Pt 4f peak is wider, the center of $4f_{7/2}$ peak is not far from 72.8 eV, and the three components ($Pt^{4+}$, $Pt^{2+}$, and $Pt^0$) failed to provide a reasonable fitting. Therefore, alternative models were considered containing multiple components around $Pt^{2+}$, involving two new components that are distinguishable from $Pt^{2+}$ but also far from $Pt^{4+}$ or $Pt^0$ as $Pt^{(2+\delta)+}$ (~73.7 eV) and $Pt^{(2-\delta)+}$ (~72.0 eV), as has been established in a recent prior publication [S6]. The combination of $Pt^{2+}$, $Pt^{(2+)+}$ and $Pt^{(2+\delta)+}$ describes most spectra well. It was noted that XPS is always susceptible to complications such as final state effects, and one needs to be cautious when assigning exact oxidation states based on small difference in binding energy. Therefore, in this work, $Pt^{(2+\delta)+}$ and $Pt^{(2+\delta)+}$ are only meant to label various Pt species we observed in XPS, and it is not intended to claim their exact electronic configuration. On post-reaction Pt-BTA/$CeO_2$, significant Pt reduction was observed, as the center of $4f_{7/2}$ peak moves to ~71.5 eV. Consequently, a component with lower binding energy is obviously indicated, which leads to the $Pt^{\delta+}$ component at ~71.3 eV. It is believed that this component strongly indicates the formation of Pt nanoparticles, as it is very close to $Pt^0$. The slightly higher binding energy of this species than $Pt^0$ might be due to metal-to-support electron transfer.

Figure 3:
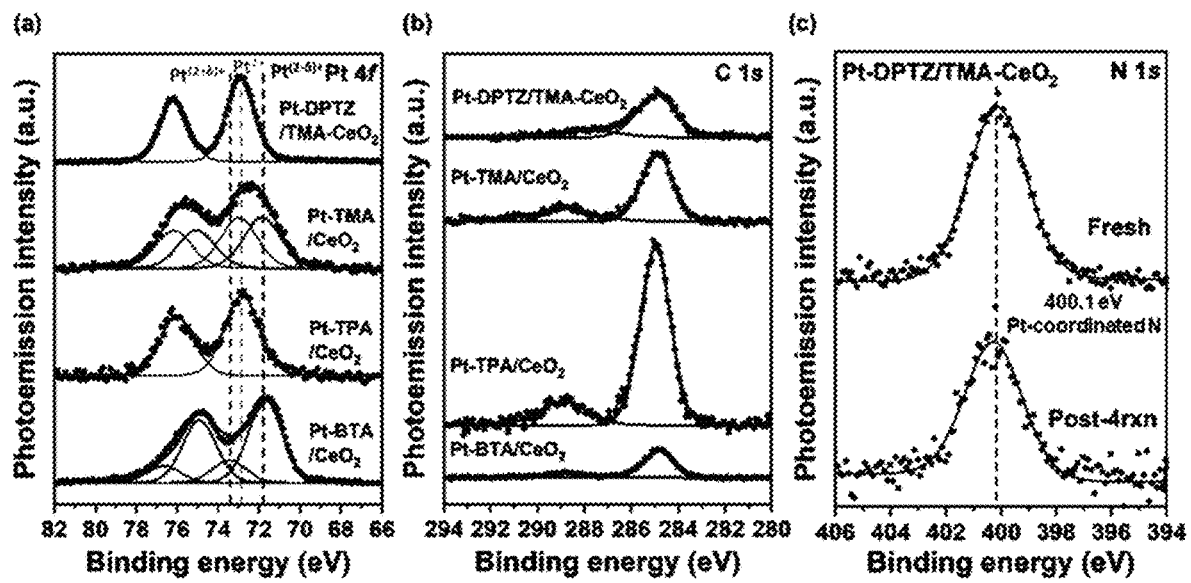
FIG. 3 depicts XP spectra of Pt-ligand LCSCs and peak fittings in (a) Pt 4f, (b) C 1s, and (c) N 1s regions. All spectra are from fresh catalysts except the bottom spectrum in (c) is from the catalyst used for 4 reaction cycles. In (a), the height of each peak is adjusted to similar level, allowing direct visualization of variations in peak width and shape. The left, center and right hand curves represent $Pt^{(2+\delta)+}$, $Pt^{2+}$, and $Pt^{(2+\delta)+}$ species respectively. In (b) and (c), each spectrum is normalized to the Pt 4f peak intensity of the same sample, and hence the peak area reflects the C:Pt or N:Pt ratio. The curves represent adventitious/aromatic C (the two are indistinguishable) and C in —COOH, respectively.
Figure 4:
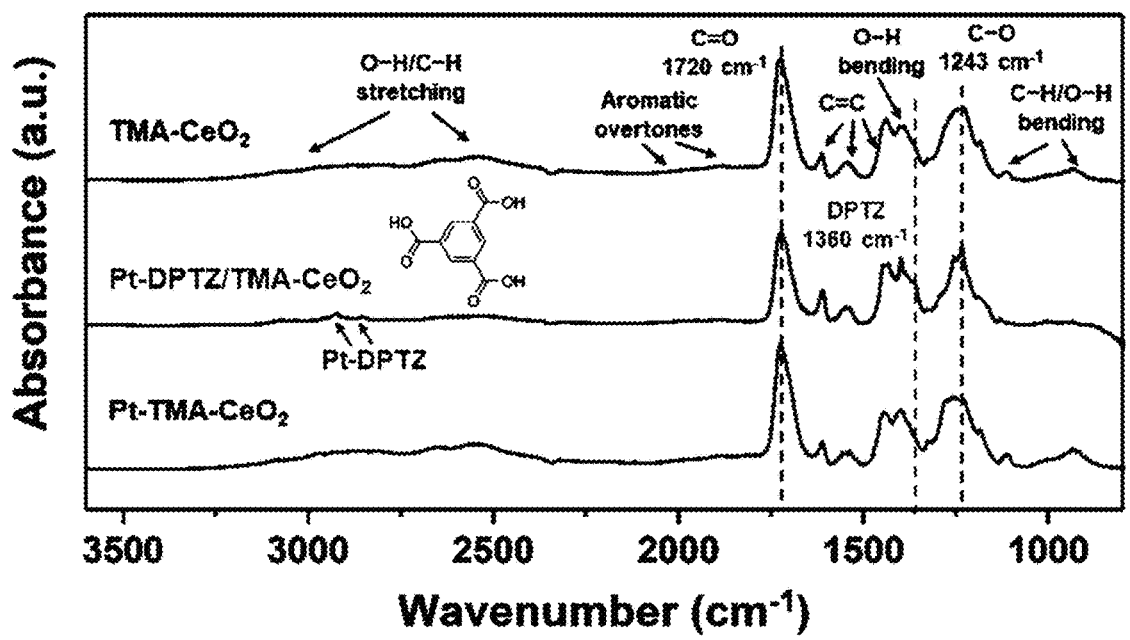
FIG. 4 depicts IR spectra of TMA-CeO$_2$, Pt-DPTZ/TMA-CeO$_2$, and Pt-TMA/CeO$_2$, showing the presence of TMA on all of them and DPTZ on Pt-DPTZ/TMA-CeO$_2$.
Figure 11:
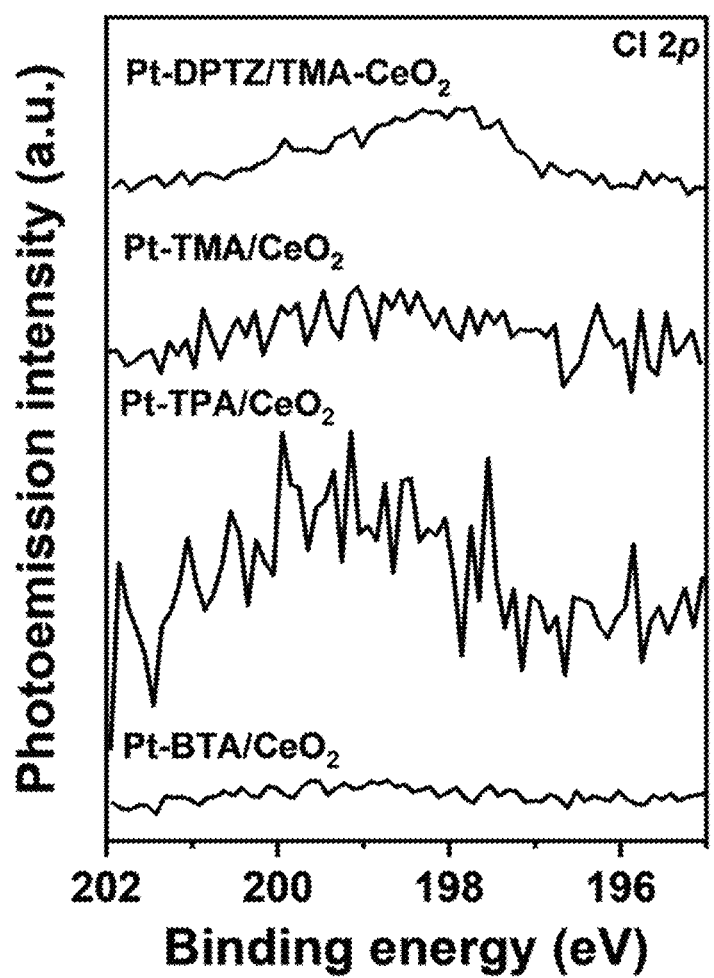
FIG. 11 provides XP spectra of Pt-DPTZ/TMA-CeO$_2$ with fittings in Cl 2p region. Each spectrum is normalized to the Pt 4f peak area of the same sample, and hence the peak area indicates Cl:Pt ratio (numbers reported in Table 1).

The presence of —COOH-based ligands on fresh catalysts is revealed by C 1s XPS, which show a component at ~288.8 eV (FIG. 3(b)), distinct from the adventitious C peak (284.8 eV), consistent with prior studies [66-68]. The peak is slightly wider than adventitious C, possibly because —COOH on the catalysts are in various chemical environments (coordinated with Pt, Ce, or uncoordinated). The high —COOH:Pt ratio (>5 in Table 1) implies only a small fraction of —COOH coordinate with Pt, and thus these ligands can stay on $CeO_2$ solely through —COOH-oxide interaction, as reported in literature [69-71]. In comparison, most bidentate N-based ligands do not stick to $CeO_2$ in the absence of Pt [51]. This indicates that —COOH-based ligands offer stronger ligand-oxide interaction, which raises the potential to enhance the recyclability of Pt-ligand complexes, the main drawback of the bidentate N-based ligands. Various amounts of residual Cl from the Pt precursor are also observed (Table 1, FIG. 11). Control experiment with NaCl shows that Cl does not stick to $CeO_2$ without Pt, and hence all Cl coordinate with Pt.

Infrared spectroscopy (IR) also shows the successful ligand deposition on TMA/$CeO_2$, Pt-DPTZ/$CeO_2$, and Pt-TMA/$CeO_2$, as they all exhibit clear TMA-derived features: O—H/C—H stretching (2500~3600 $cm^{-1}$, broad band due to hydrogen bond), aromatic overtones (1800~2000 $cm^{-1}$, weak), C=O stretching (1720 $cm^{-1}$), aromatic C=C stretching (1450~1650 $cm^{-1}$), C—O stretching (1243 $cm^{-1}$), and O—H/C—H bending (1421 $cm^{-1}$ and 1000~1150 $cm^{-1}$ for in-plane modes, 800~1000 $cm^{-1}$ for out-of-plan modes).

In addition, Pt-DPTZ/TMA-CeO$_2$ also shows peaks at 1360 cm$^{-1}$ and between 2800 and 3000 cm$^{-1}$, consistent with a previous observation on Pt-DPTZ/Al$_2$O$_3$[51], proving the presence of DPTZ. The relative intensity of C=O feature compared to C—O decreases after Pt-DPTZ deposition, suggesting Pt—COOH coordination that essentially converts C=O to C—O. This is not observed on Pt-TMA/CeO$_2$, likely due to the high —COOH:Pt ratio (19 compared to 5 on Pt-DPTZ/TMA-CeO$_2$, Table 1). Besides, N is XPS peak on Pt-DPTZ/TMA-CeO$_2$ is centered at 400.1 eV (FIG. 3(c) top), shifted to higher BE compared to free DPTZ (400.0+ 398.4 eV for tetrazine and pyridyl N) and losing the two-component character, consistent with Pt—N coordination in previous studies [56]. In summary, the combination of TEM, XPS, and IR suggest that the targeted highly, even atomically, dispersed Pt cationic species are successfully created with —COOH-based ligands, in which Pt bind with Cl, —COOH, CeO$_2$, and N from DPTZ (in the case Pt-DPTZ/TMA-CeO$_2$).

Figure 12:
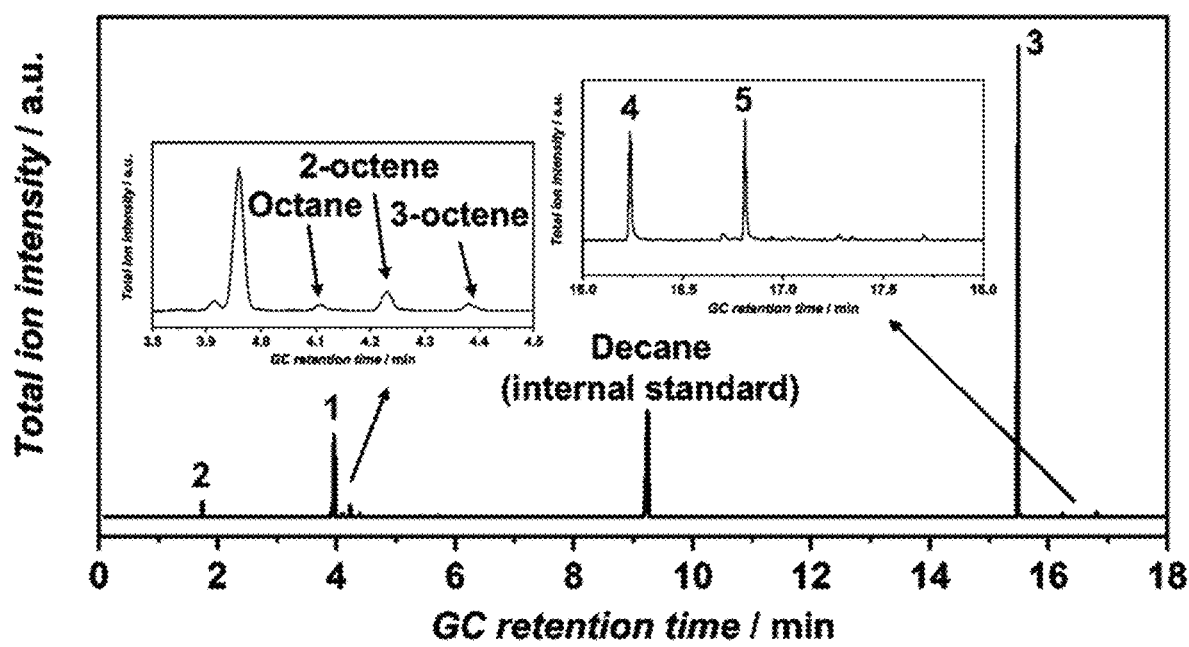
FIG. 12 is a representative GC-MS spectrum from a post-reaction solution, showing the formation of the desired product 3 and by-products. Numbers in the figure refer to compound numbers in Scheme 2. The concentration of main Si-containing by-products 4 and 5 is extremely low compared with 3, and no Markovnikov addition product is observed, showing high selectivity of the catalyst.

Hydrosilylation was chosen between 1-octene (1) and dimethoxymethylsilane (2) to evaluate the Pt LCSCs for its simplicity (See Scheme 2). Toluene was used as the solvent because it was discovered that it yields higher Pt recovery rate than hexane and no-solvent conditions [52]. Due to unavoidable alkene isomerization and hydrogenation, the reaction was conducted with 1.2 eq. 1. All catalysts show activity under mild conditions (<=70° C. Table 2), yielding desired anti-Markovnikov addition product 3. The TONs here do not reflect the limit in catalyst lifetime: more turnover could be achieved by elevating temperature, extending reaction time, or applying more substrates. The average TOF in 20 or 30 min at 70° C. ranges from 2400 to 84000 h$^{-1}$, indicating that the Pt LCSCs are drastically more active than Pt SACs reported in literature (average TOF=780 or <200 h$^{-1}$ at 90° C.). Low-concentration by-products 4 and 5 (octyl-substituted silane dimers) are observed (FIG. 12), with no Markovnikov addition product. The by-products are not detected by GC-MS in the as-purchased reactants. The selectivity towards 3 is >90% at 100% 2 conversion (entry 3 and 4), slightly improved from 86% with Karstedt catalyst (in entry 11 and 78% in literature [34]), and the selectivity is not noticeably impacted by temperature or reaction time. Meanwhile, the conversion of 2 is difficult to quantify precisely due to its volatility. Therefore, instead, the yield of 3 to represent catalyst activity was used.

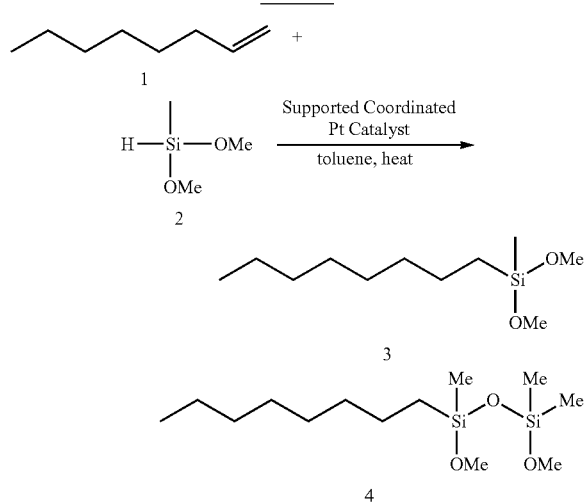

Scheme 2

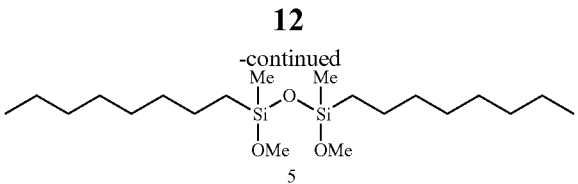

TABLE 2

Catalytic performance of Pt LCSCs with —COOH ligands in the hydrosilylation reaction between 1-octene 1 and dimethoxymethylsilane 2.

| Entry | Catalyst | T (° C.) | t (min) | Yield[a] (%) | $n_{Pt}$ (μmol) | TON[b] (10$^3$) |
|---|---|---|---|---|---|---|
| 1 | Fresh Pt-DPTZ/TMA-CeO$_2$ | 70 | 30 | 19 | 0.83 | 1.2 |
| 2 | Recycled Pt-DPTZ/TMA-CeO$_2$[c] | 70 | 30 | 58 | 0.58 | 3.7 |
| 3 | Pt-TMA/CeO$_2$ | 70 | 30 | 92 | 0.28 | cc |
| 4 | Pt-TMA/CeO$_2$ | 50 | 30 | 90 | 0.28 | cc |
| 5 | Pt-TMA/CeO$_2$ | 40 | 20 | 31 | 0.28 | 5.9 |
| 6 | Pt-TMA/CeO$_2$-1/5[d] | 70 | 30 | 74 | 0.09 | 42 |
| 7 | Pt-TPA/CeO$_2$ | 70 | 30 | 63[e] | 0.16 | 15 |
| 8 | Pt-TPA/CeO$_2$ | 60 | 20 | 7 | 0.16 | 1.6 |
| 9 | Pt-BTA/CeO$_2$ | 70 | 30 | 74 | 0.68 | 5.4 |
| 10 | Pt-BTA/CeO$_2$ | 60 | 20 | 46 | 0.68 | 3.3 |
| 11 | Karstedt catalyst | 70 | 30 | 86 | 0.14 | cc |

[a]Yield values reported here are GC-MS values based on 2 because excess 1 (1.2 eq) was used.
[b]TON per Pt values are only calculated if 2 was not completely converted (cc).
[c]The catalyst used in this experiment was recycled from the experiment in entry 1.
[d]Pt-TMA/CeO$_2$-1/5 refers to a Pt-TMA/CeO$_2$ catalyst using 1/5 amount of Pt during the synthesis.
[e]Four repetitions of this experiment generated values with large variations: 80%, 68%, 41%, and 62%, and the value here is the average. This is attributed to high sensitivity of catalyst activation process to temperature.

3.2. Pt-DPTZ/TMA-CeO$_2$: A Highly Reusable Catalyst with the "Anchoring Ligand"

Figure 13:
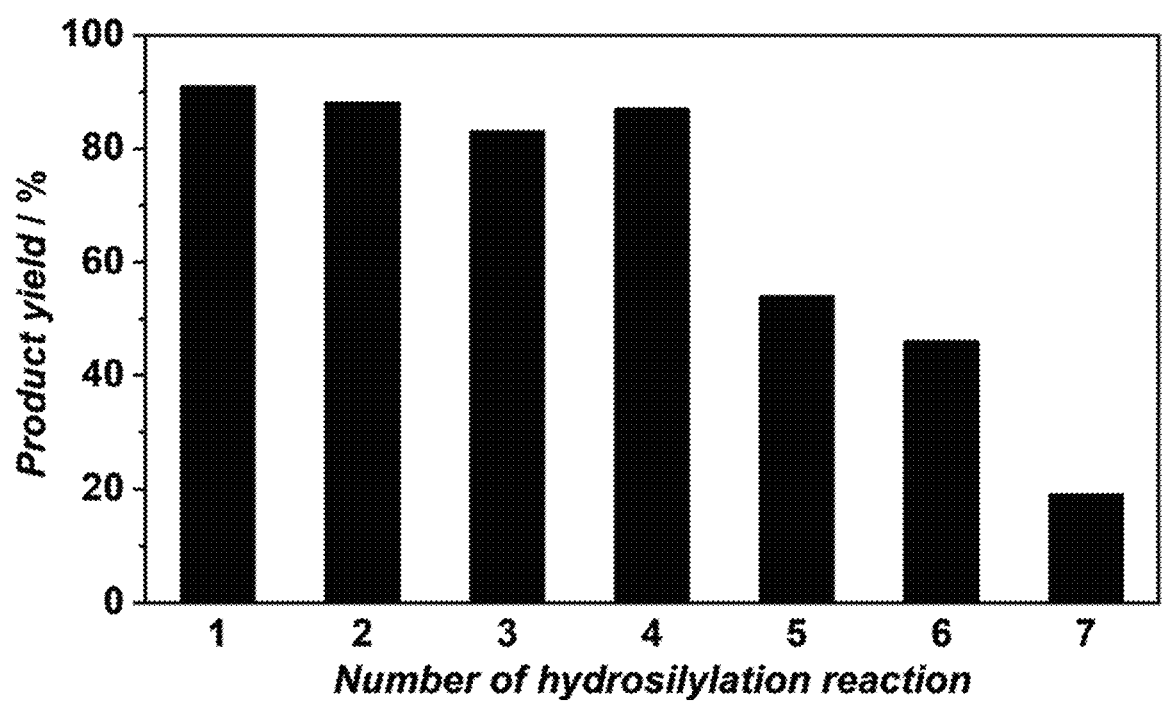
FIG. 13 provides reusability test results of Pt-DPTZ/CeO$_2$ for seven batches. In the first four batches, complete conversion of 2 is achieved, so the product yield does not change significantly despite of significant active site leaching. Nonetheless, as the leaching continues, the quick drop in catalyst activity is observed when conversion deviates from 100% (batches 4-7).

Pt-DPTZ/TMA-CeO$_2$ was designed to enhance the reusability of the previously reported Pt-DPTZ/CeO$_2$ LCSC, employing TMA as an "anchoring ligand". Despite showing atomic dispersion of Pt and desired improvements over commercial catalysts in key aspects, Pt-DPTZ/CeO$_2$ has the disadvantage of exhibiting deactivation due to active site leaching (FIG. 13) [52]. It was hypothesized that modifying CeO$_2$ with TMA before depositing Pt-DPTZ offers —COOH as "anchoring sites", which bind with Pt more tightly than surface O from CeO$_2$, and thus alleviates the leaching of Pt-DPTZ complexes. More examples and discussion of the "anchoring ligand" strategy were reported recently in a separate publication [53].

Figure 5:
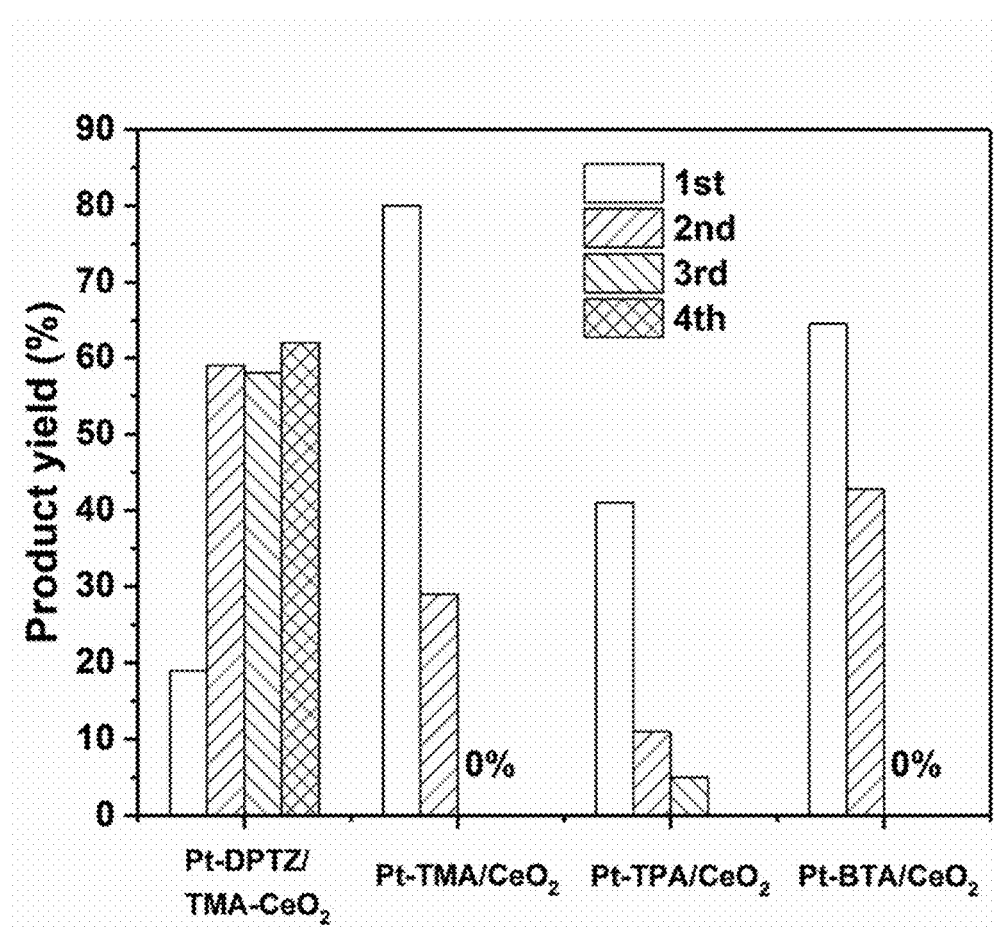
FIG. 5 provides reusability test results of Pt LCSCs in 1-octene hydrosilylation. Pt-DPTZ/TMA-CeO$_2$ was tested for four batches while others were tested for three batches. Reaction condition: T=70° C. (except 50° C. for Pt-TMA/CeO$_2$ due to high activity), t=30 min, 30 mg catalyst, 6 mmol 1, 5 mmol 2, and 3 mL toluene. After being fully activated in the first batch, Pt-DPTZ/TMA-CeO$_2$ does not exhibit any activity loss in the next three batches. All other catalysts suffer from significant deactivation after the first batch due to active site leaching. Pt-TMA and Pt-BTA show zero activity in the third batch.

FIG. 5 shows that Pt-DPTZ/TMA-CeO$_2$ is a highly reusable catalyst. At 70° C., the catalyst exhibits limited activity in the first batch of the reaction (19% yield in 30 min, entry 1 in Table 2). Nonetheless, the activity increases significantly in the second batch (58% yield in 30 min, entry 2) and does not drop for three consecutive batches. In contrast, quick activity loss on Pt-DPTZ/CeO$_2$ was observed once the conversion of 2 drops below 100% (FIG. 13; complete conversion was achieved in the first four batches, and thus despite the fact that the deactivation occurs, it is not observed experimentally) [52]. The drastic comparison demonstrates that applying TMA as the "anchoring ligand", as hypothesized, enhances the reusability of Pt-DPTZ/CeO$_2$. The electron-rich property of TMA offers strong —COOH-support interaction that allows TMA to stick to CeO$_2$, where its uncoordinated —COOH stabilize Pt-DPTZ and hence alleviate active site leaching. The low activity in the first batch in FIG. 5 was attributed to an extended induction period, i.e., the activation of the catalyst is not complete until the final minutes of the first batch. The induction period was also observed on the original Pt-DPTZ/CeO$_2$ LCSC, but is significantly shorter (<3 min) and associated with Cl leaving Pt as well as C=C coordination [51, 52]. The extended induction period may be related to the added complexity of the active site. It was noted that although the activity drops slightly with TMA addition as the "anchoring ligand," in practice, this could be easily compensated by applying more catalysts or harsher conditions. In comparison, catalyst deactivation is a highly concerning challenge in hydrosilylation catalysis that does not have a simple solution. Therefore, the reusability enhancement by TMA is much more valuable than the minor activity decrease.

Figure 6:
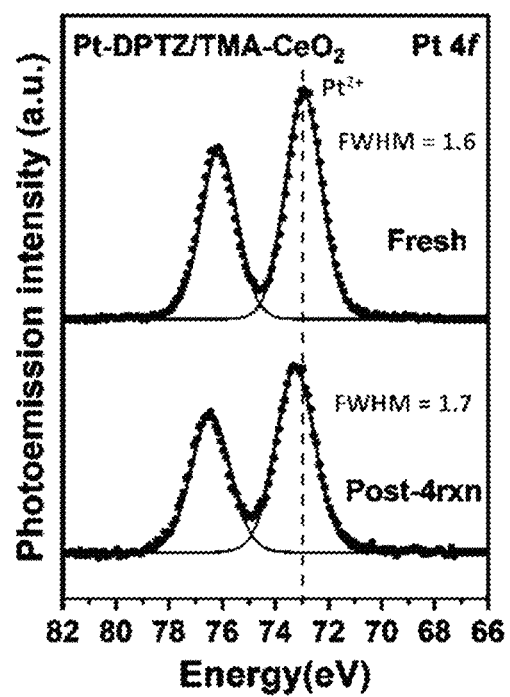
FIG. 6 provides fittings of Pt 4f XP spectra of Pt-DPTZ/TMA-CeO$_2$, fresh (top), and after four batches of the reaction (bottom). Each spectrum is normalized to the Ce 3d XPS peak intensity, and hence the peak area in this graph indicates the XPS Pt:Ce ratio. On Pt-DPTZ/TMA-CeO$_2$, Pt remain as a single Pt$^{2+}$ component after four batches, showing excellent on-surface structural stability. The minor intensity drop suggests slight Pt leaching (~20%).
Figure 14:
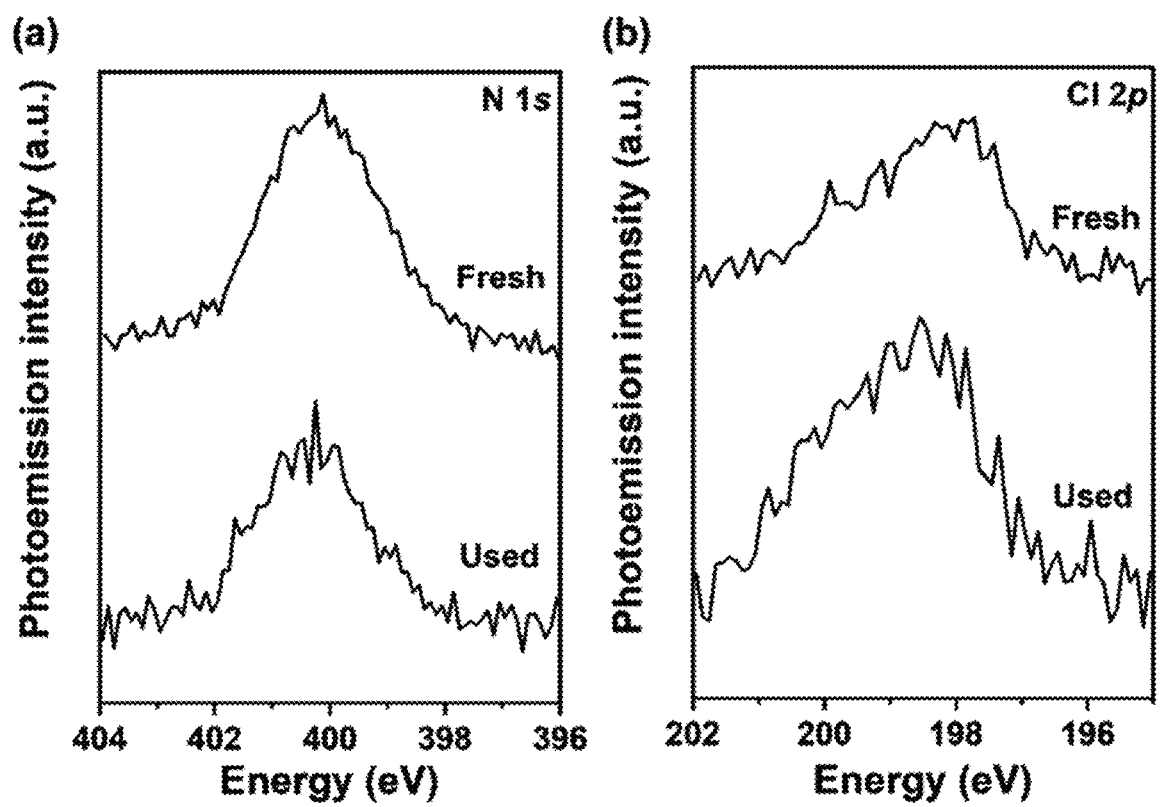
FIG. 14 provides XP spectra of Pt-DPTZ/TMA-CeO$_2$ with fittings in (a) N is and (b) Cl 2p regions, including its fresh form (top) and after four batches of the reaction (bottom). Each spectrum is normalized to the Pt 4f peak area of the same sample, and hence the peak area indicates N:Pt or Cl:Pt ratio (exact values reported in Table 3).

Table 3 shows that even after four batches of the reaction, most Pt (68% based on ICP and 80% based on XPS Pt:Ce ratio) still remain on Pt-DPTZ/TMA-CeO$_2$, showing significant improvement in Pt recyclability over Pt-DPTZ/CeO$_2$ (66% Pt recovery after only one batch) [52]. This again shows that TMA, as an anchoring ligand, helps stabilize and recycle Pt-DPTZ complexes. Interestingly, the 20-30% Pt loss from Pt-DPTZ/TMA-CeO$_2$ during the first four batches does not decrease its activity at all, implying that the actual active sites are stable during catalysis, while leached species are mostly inactive. XPS also show that the post-reaction catalyst exhibits similar Pt 4f$_{7/2}$ BE (~72.9 eV, consistent with Pt$^{2+}$) and FWHM with the fresh catalyst (Table 3 and FIG. 6), without any signs of Pt reduction, suggesting Pt remain as highly dispersed Pt$^{2+}$. These results are in line with previous observations on Pt-DPTZ/CeO$_2$ LCSCs, suggesting that the strong resistance against Pt aggregation, one of the key advantages of Pt-DPTZ/CeO$_2$ over Karstedt catalyst and other homogeneous catalysts, is maintained on Pt-DPTZ/TMA-CeO$_2$. XPS also show that Cl:Pt ratio increases (0.7 to 1.3) while DPTZ:Pt decreases slightly (0.78 to 0.53) after the reaction (Table 3, FIG. 14), implying Pt bound with more DPTZ might be more susceptible to leaching than Pt bound with more Cl. The position of N is XPS peak does not shift (400.1 eV in FIG. 3(c)), indicating DPTZ on the surface remains coordinated with Pt after catalysis. In contrast, it was previously reported that after the same reaction on Pt-DPTZ/CeO$_2$, DPTZ:Pt remains unchanged. Cl:Pt decreases, which is attributed to the necessity of Cl leaving Pt opening coordination sites for reactants [52]. The difference induced by the introduction of TMA demonstrates that the anchoring ligand alters not only the stability of Pt sites, but also the behavior of Pt sites during hydrosilylation catalysis.

TABLE 3

Comparisons of fresh and post-reaction Pt-DPTZ/TMA-CeO$_2$ from ICP and XPS

|  | Fresh | Post-rxn (4 batches) |
| --- | --- | --- |
| Pt wt % (ICP) | 0.54 | 0.37 |
| Pt recycle rate (ICP) |  | 68% |
| Pt:Ce (XPS)[a] | 0.25 | 0.20 |
| Pt recycle rate (XPS) |  | 80% |
| Pt 4f$_{7/2}$ BE | 72.9 | 73.1 |
| Pt 4f FWHM | 1.6 | 1.7 |
| Cl:Pt[a] | 0.7 | 1.3 |
| DPTZ:Pt[a] | 0.78 | 0.53 |

[a]Pt:Ce, Cl:Pt ratios were calculated using XPS peak areas of Pt 4f, Ce 3d, and Cl 2p regions and relative sensitivity factors. N:Pt ratios were also calculated using N 1s and Pt 4f region, which were then used to derive DPTZ:Pt ratio. XP spectra in Cl 2p and N 1s regions (normalized to Pt) are included as FIG. 14.

Discussions about Determining Pt Recovery Rate from XPS and ICP

XPS data were analyzed to establish quantitative relationship between elements. After energy calibration and background subtraction, atomic ratios between elements were calculated based on the peak area in Pt 4f, Ce 3d, C 1s, and Cl 2p regions. In previous publications, changes in both Pt:Ce ratio have been used from XPS and Pt wt % from ICP to evaluate Pt recovery percentage after reactions [S5]. These two methods have been yielding numbers consistent with each other [S5]. The high dispersion of Pt ensures all Pt are detectable by XPS and hence it does not underestimate Pt contents. However, on some samples in this work, it was observed that after three batches of the reaction, the intensity of Ce 3d XPS peak drops to very low level so that proper background subtraction becomes difficult. In addition, for Pt-BTA/CeO$_2$, significant Pt reduction and aggregation were indicated by Pt 4f XPS. These two factors question the validity of using changes in Pt:Ce ratio to calculated Pt recovery percentage. Particularly, following this strategy, 170% Pt recovery was obtained with Pt-BTA/CeO$_2$ after three batches, suggesting it is not appropriate. Therefore, in Table 3, ICP was relied upon to evaluate Pt recovery after three batches. As for samples after one batch, no significant decrease in Ce 3d XPS intensity was identified, and hence one can still use Pt:Ce ratio from XPS in Table 3.

3.3. Pt-TMA/CeO$_2$: The Most Active Supported Coordinated Pt Hydrosilylation Catalyst Pt-TMA/CeO$_2$ is by far the most active Pt hydrosilylation LCSC. Table 2 shows that it completely converts all 2 in 30 min at 50° C. (entry 4), while none of other three catalysts achieve so even at 70° C. (entry 1, 2, 7, and 9). Pt-TMA/CeO$_2$ is highly active even at close to room temperature, with the TON in 20 min of 5.9×10$^3$ at 40° C. (entry 5), higher than other catalysts at 60° C. (entry 8 and 10). Its activity is also superior to the most active bidentate N-based Pt LCSC previously reported, which showed a TON of 6.5×10$^3$ in 20 min at 60° C. [52], similar with Pt-TMA/CeO$_2$ at 40° C. (entry 5). The selectivity on Pt-TMA/CeO$_2$ is similar to Pt-DPTZ/CeO$_2$ at 100% 2 conversion (92% and 91% respectively) [52], and higher than Karstedt catalyst (<86%) [34, 52]. Taking advantage of the high activity, the amount of Pt used in synthesis to 1/5 (referred to as Pt-TMA/CeO$_2$-1/5) was reduced; the actual Pt wt % dropping to 1/3 according to ICP). Pt-TMA/CeO$_2$-1/5 still exhibits satisfactory activity, yielding 74% 3 at 70° C. in 30 min (entry 6). The TON is almost 3 times of any other LCSCs under identical conditions, exhibiting the superior Pt utilization efficiency. The superior activity of Pt-TMA/CeO$_2$ may result from the Pt$^{(2-\delta)+}$ species, which is not present on most other samples.

Figure 15:
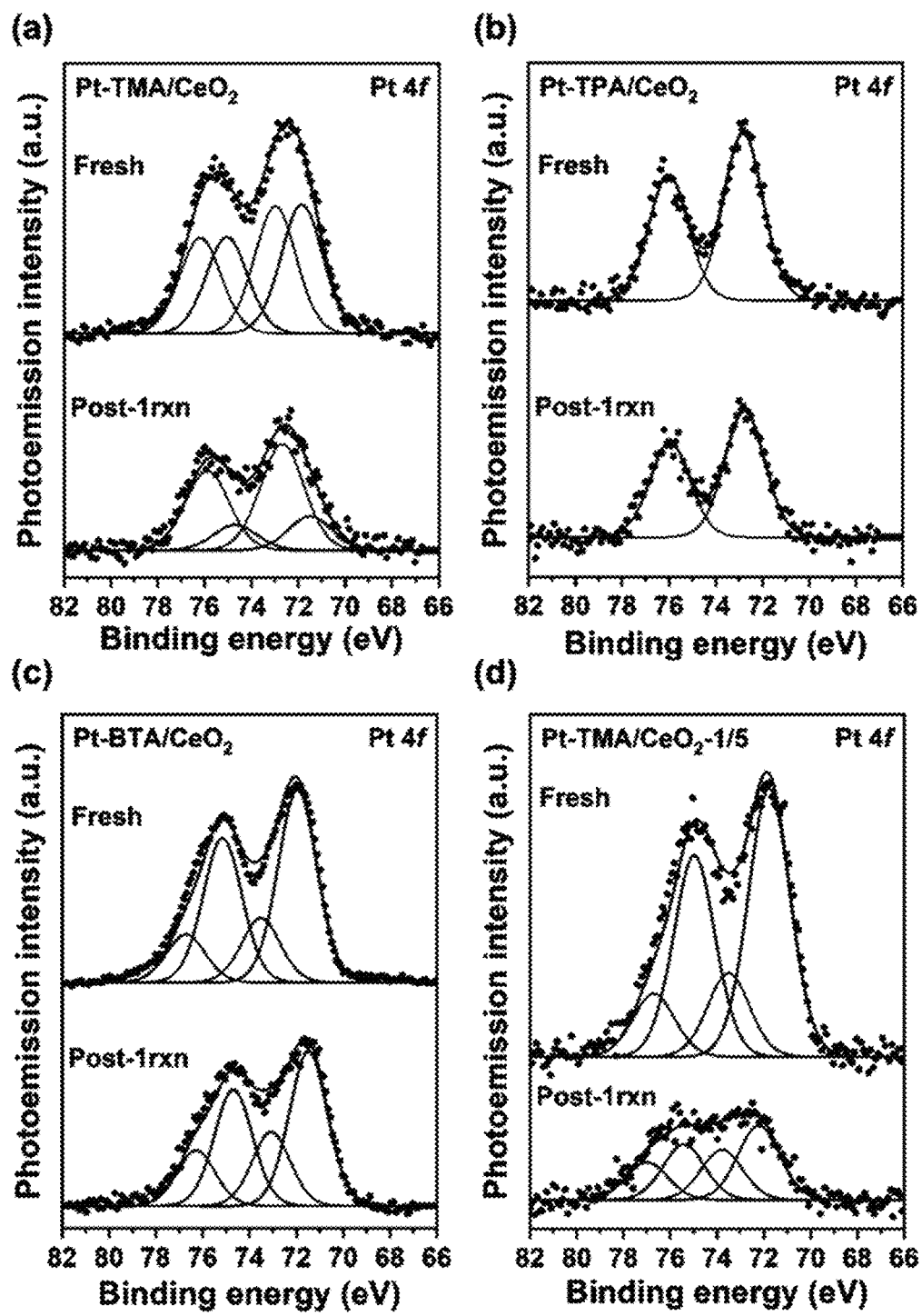
FIG. 15 provides Pt 4f XP spectra of (a) Pt-TMA/CeO$_2$, (b) Pt-TPA/CeO$_2$, (c) Pt-BTA/CeO$_2$, and (d) Pt-TMA/CeO$_2$-1/5, including their fresh form and after one batch of the reaction. Each spectrum is normalized based on the Ce 3d peak area of the same catalyst so that the peak area in this graph reflects Pt:Ce ratio from XPS. These spectra were used to calculate Pt recovery rate after the first batch (shown as Table 4). This graph also includes Pt 4f fittings, where fit components for Pt$^{(2+)+}$, Pt$^{2+}$, Pt$^{(2-\delta)+}$, and Pt$^{\delta+}$ species are at binding energies of 73.5, 72.9, 71.9, and 71.3 eV, respectively.

The main challenge Pt-TMA/CeO$_2$ faces is its reusability. FIG. 5 demonstrates that at 50° C., fresh Pt-TMA/CeO$_2$ is highly active (80% yield in 30 min). Nevertheless, when recycled, the activity drops quickly in the second batch (29% yield) and completely disappears in the third. Table 4 shows severe Pt leaching during catalysis, with only 56% and 41% Pt recovered after one and three batches respectively, corresponding to the activity loss. Pt-TMA/CeO$_2$-1/5 exhibits similar Pt recyclability (40% Pt recovery after one batch, FIG. 15(d)). The higher percentage of activity loss than total Pt loss implies that Pt sites with higher activity are more susceptible to leaching than less active ones. Despite ~40% Pt sites being stable enough to survive three batches, they are inactive for the reaction.

TABLE 4

Post-hydrosilylation composition changes of Pt
LCSCs with —COOH-based coordination ligands.

| | Pt recovery (%) | | —COOH recovery (%) | Cl:Pt | |
|---|---|---|---|---|---|
| | 1 batch[a] | 3 batches[b] | 1 batch[c] | Fresh | Post-rxn[d] |
| Pt-TMA/CeO$_2$ | 56 | 41 | 84 | 0.3 | 0.2 |
| Pt-TPA/CeO$_2$ | 86 | 24 | 95 | 1.3 | 0.9 |
| Pt-BTA/CeO$_2$ | 70 | 34 | 91 | 0.1 | 0.1 |

Figure 16:
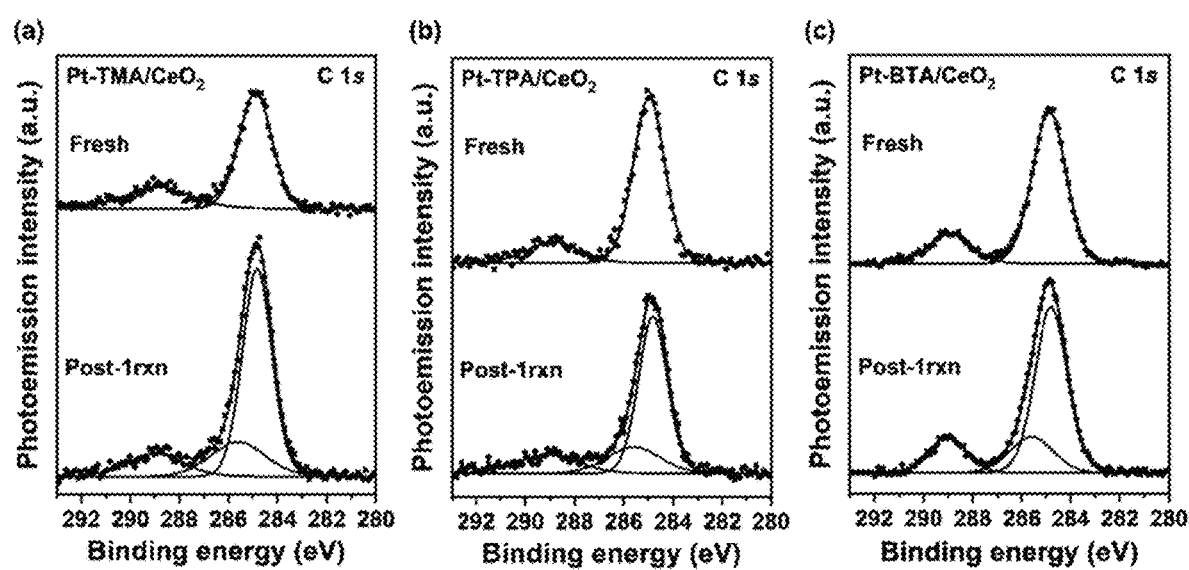
FIG. 16 provides C 1s XP spectra of (a) Pt-TMA/CeO$_2$, (b) Pt-TPA/CeO$_2$, and (c) Pt-BTA/CeO$_2$, including their fresh form and after one batch of the reaction. Each spectrum is normalized based on the Ce 3d peak area of the same catalyst so that the peak area in this graph reflects C:Ce ratio from XPS. In the fittings shown in these figures, fit components are included for C in —COOH (~288.8 eV), C in —OCH$_3$ from adsorbed products (~285.8 eV), and adventitious C (~284.8 eV). —COOH recovery rate after the first batch (shown as Table 4 in the manuscript) was calculated for each catalyst using the ratio between the ~288.8 eV component and Ce.

[a]Pt recovery values after one batch were calculated based on Pt:Ce ratio in XPS. Pt 4f XP spectra of all fresh and post-reaction catalysts (normalized to Ce 3d peak area) can be found as FIG. 15.
[b]Pt recovery values after three batches were calculated based on ICP Pt wt %. See SI for detailed discussions about the method choices.
[c]—COOH recovery values after one batch were calculated based on the ratio between the ~288.8 eV C 1s component and Ce in XPS. C 1s XP spectra of all fresh and post-reaction catalysts (normalized to Ce 3d peak area) can be found as FIG. 16.
[d]"Post-rxn" refers to the catalyst recovered after one batch of the reaction at 70° C. for 30 min.

Figure 17:
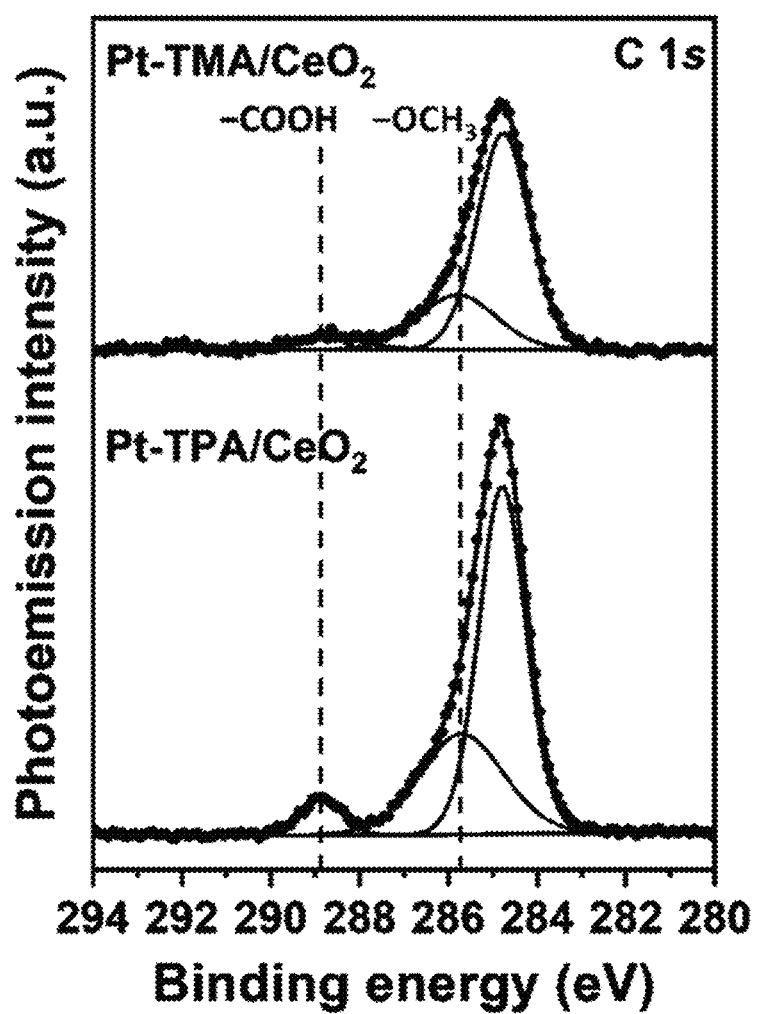
FIG. 17 provides C 1s XP spectra of Pt-TMA/CeO$_2$ (top) and Pt-TPA/CeO$_2$ (bottom) after three batches reaction. The presence of the ~288.8 eV shoulder suggests the presence of —COOH on both post-reaction catalysts [S7-9]. The component at ~285.7 eV can be assigned to —OCH$_3$ groups from adsorbed products [S10-12].

C 1s XPS reveals relatively stable ligand-support binding: after one batch, most (84%, Table 4) TMA remains on CeO$_2$, and after three batches, a significant amount of TMA is still observed (FIG. 17, compared to FIG. 3(b)). A significantly higher fraction of the ligand are recovered after one batch than Pt (56%), indicating that some Pt are leached off the support, but leaving TMA behind. This behavior differs from previous results with bidentate N-based ligands, where Pt are always leached as Pt-ligand units, leading to similar recovery percentage between Pt and the ligand [52]. The comparison reflects a fundamental difference between the two families of ligands: with bidentate N-based ligands, Pt-ligand coordination is strong enough to retain through reactions, but the Pt-ligand complex interacts weakly with the support and thus is vulnerable to leaching as a unit. In contrast, —COOH-based ligands offer stronger ligand-support interaction, but as discussed in section 3.1, the Pt-ligand coordination is not as favored, so that Pt leaves ligand-support by itself during catalysis. Consequently, the potential to improve catalyst reusability with the enhanced ligand-support interaction from —COOH is limited by the weaker Pt-ligand interaction.

3.4. Pt-TPA/CeO$_2$: A Catalyst with Highly Dispersed and Uniform Pt Sites

Figure 7:
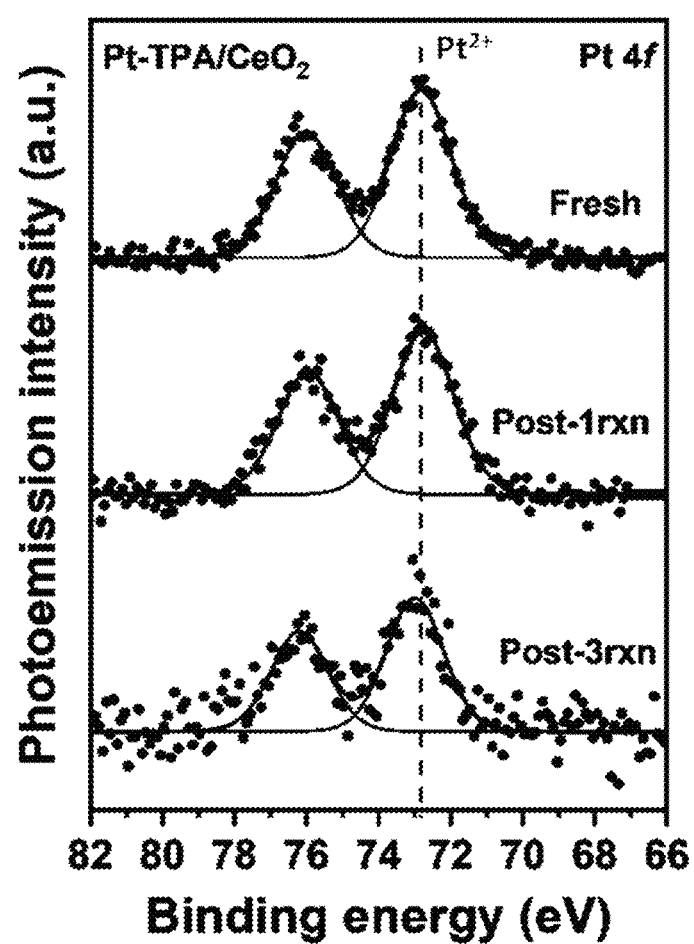
FIG. 7 provides fittings of Pt 4f XP spectra of Pt-TPA/CeO$_2$, including its fresh form (top), after one batch of the reaction (middle), and after three (bottom) batches of the reaction. All spectra are normalized so that peaks are of similar intensity for better peak shape comparison, and hence the peak area in this graph does not have any implications of Pt content on the catalysts. On Pt-TPA/CeO$_2$, Pt remain as a single Pt$^{2+}$ component through three batches.

TPA creates the most uniform Pt sites among three —COOH-based ligands as the coordination ligand. Table 1 and FIG. 3(a) exhibit that the Pt 4f XP spectrum of Pt-TPA/CeO$_2$ is consistent with a single Pt$^{2+}$ component (72.9 eV, FWHM=2.0 eV), indicating highly uniform oxidation state. The spectrum resembles that of Pt-DPTZ/CeO$_2$ [51], on which Pt have been conclusively proved to be atomically dispersed by detailed characterization, indicating high Pt dispersion on the sample. In addition, Pt-TPA/CeO$_2$ shows the highest —COOH:Pt and Cl:Pt ratios among the three (Table 1), suggesting that Pt are most coordinated with O and Cl and thus least likely to form aggregates. The resistance against aggregation of these highly dispersed, uniform Pt$^{2+}$ sites is supported by post-reaction characterization. FIG. 7 shows that the position and width of Pt 4f XPS peak remain unchanged after three batches of hydrosilylation reaction, showing no signs of reduction. This indicates that Pt$^{2+}$ have excellent stability during catalysis as long as they stay on the surface (not leached).

Pt-TPA/CeO$_2$ catalyzes hydrosilylation at both 60° C. and 70° C. (entry 7 and 8 in Table 2). Nonetheless, its activity is extremely sensitive to temperature: TON goes up drastically from $1.6 \times 10^3$ at 60° C. in 20 min (entry 8) to $15 \times 10^3$ at 70° C. in 30 min (entry 7), an almost 10-fold increase. Meanwhile, it was discovered that small perturbations in reaction temperature can induce large variations in its activity. In experiments, when the temperature was set to 70° C., the actual water bath temperature varied between 68° C. and 72° C. This does not have significant impacts on any other catalysts studied, as the yield difference among multiple repetitions is within 5%. Nevertheless, the yield from four repetitions with Pt-TPA/CeO$_2$ show significant fluctuations (80%, 68%, 41%, and 62% respectively). The extremely strong activity dependence on temperature between 60 and 70° C. far exceeds predictions from Arrhenius Law. It is suspected that there is a highly temperature-sensitive catalyst activation process, leading to temperature-dependent structure under reaction conditions. The presence of an activation process is implied by the decrease in Cl:Pt ratio after catalysis (from 1.3 to 0.9, Table 4), a phenomenon previously reported on Pt-DPTZ LCSCs leading to their activation [51, 52].

Similar to Pt-TMA/CeO$_2$, Pt-TPA/CeO$_2$ is also challenged by its reusability. In FIG. 5, product yield drops from 41% in the first batch to only 5% in the third batch. Its behaviors in Pt and ligand recovery also resemble Pt-TMA/CeO$_2$: significant Pt leaching is observed, with only 86% and 24% Pt recovery after one and three batches, respectively (Table 4); TPA recovery rate is higher (95% after one batch) than Pt (86%), and some TPA remain on CeO$_2$ after three batches (FIG. 17). Again, these results imply that it is the relatively weak Pt-ligand coordination, not the interaction between the Pt-ligand complex and CeO$_2$, that limits Pt recyclability.

3.5. Pt-BTA/CeO$_2$

Figure 8:
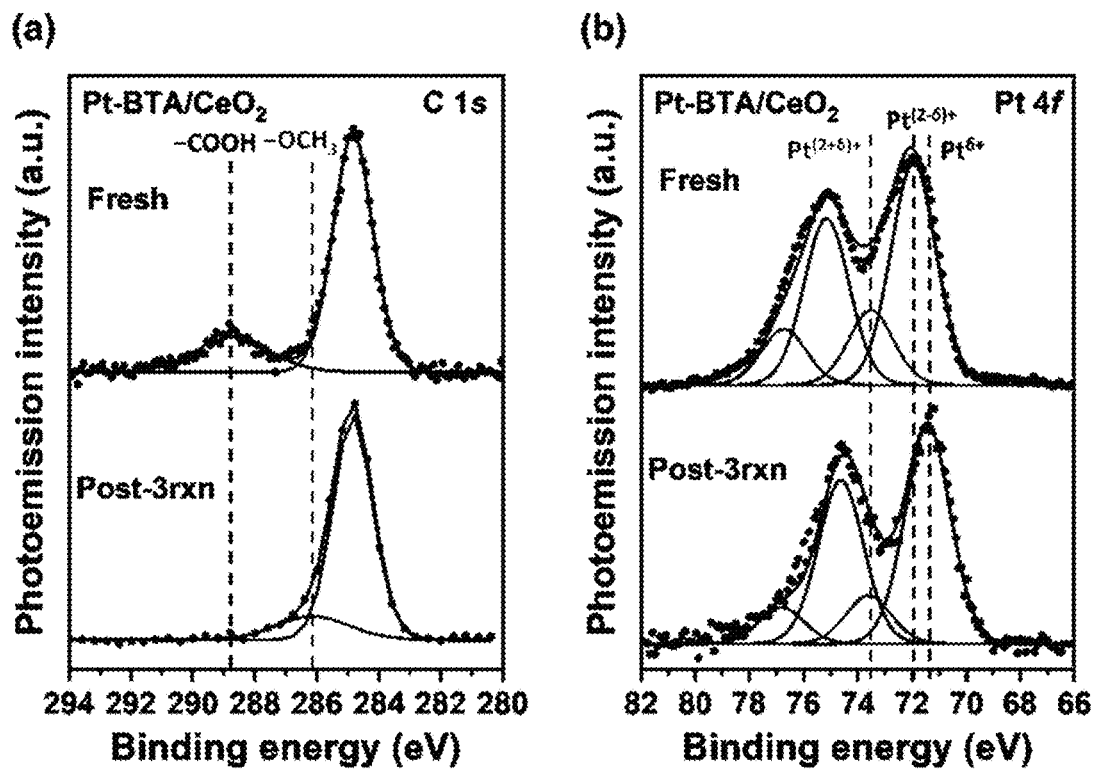
FIG. 8 XP spectra of Pt-BTA/CeO$_2$ with fittings in (a) C 1s and (b) Pt 4f regions, including its fresh form (top) and after three batches of the reaction (bottom). All spectra are normalized so that peaks are of similar intensity for better peak shape comparison, and hence the peak area in this graph does not have any implications of Pt or C contents on the catalysts. The —COOH peak in C 1s region disappears after reactions, suggesting the complete desorption of BTA. The shoulder at ~286 eV corresponds with —OCH$_3$ from adsorbed hydrosilylation products [72-74]. Pt are reduced to principally Pt$^{\delta+}$ species, which is close to Pt$^0$, implying on-surface aggregation.

Pt-BTA/CeO$_2$ also shows satisfactory hydrosilylation activity at 60 and 70° C. (entry 9 and 10 in Table 2), but is completely deactivated after three batches (FIG. 5). Besides Pt leaching similar to Pt-TMA/CeO$_2$ and Pt-TPA/CeO$_2$ (70% and 34% after one and three batches, respectively, Table 4), XPS also shows complete ligand loss and significant Pt reduction. FIG. 8a exhibits that after three batches, the —COOH C 1s component (~288.8 eV) completely disappears, indicating all BTA desorb from CeO$_2$. FIG. 8(b) and S7(c) shows that at the same time, Pt are reduced, with Pt $4f_{7/2}$ BE shifting from 72.0 eV to 71.4 eV. Fittings reveal that fresh Pt-BTA/CeO$_2$ mainly contains Pt$^{(2+\delta)+}$ species at 71.9 eV, while after the reaction, most Pt are reduced to Pt$^{\delta+}$ (71.3 eV), a species closer to Pt$^0$ (~70.8 eV) than Pt$^{2+}$ (~72.8 eV). This implies the instability of dispersed Pt cations on Pt-BTA/CeO$_2$: Pt aggregates gradually on the surface during catalysis. The aggregation is undesired, as it reduces Pt utilization efficiency by creating bulk Pt atoms inaccessible to the reactants. This established that supported Pt particles are not as effective as atomically dispersed Pt$^{2+}$ for this reaction [51, 52]. The complete BTA desorption should be relevant to Pt reduction because the most important stabilizing force for isolated Pt cations is lost. It was also noted that compared to Pt-TMA/CeO$_2$ and Pt-TPA/CeO$_2$, fresh Pt-BTA/CeO$_2$ has the lowest —COOH:Pt ratio, Cl:Pt ratio, and Pt $4f_{7/1}2$ BE (Table 1), indicating that before the reaction, Pt sites on the sample are also the most reduced and least coordinated. Additionally, among all Pt LCSCs it was investigated in this work and previously [51, 52], Pt-BTA/CeO$_2$ is the only one showing light gray color instead of yellow. These facts suggest the possible presence of small particles even before catalysis. The failure of BTA to stabilize highly dispersed Pt cations highlights the importance of proper ligand choice in synthesizing LCSCs: the ligand must provide strong enough interaction with both metal and support to maintain high dispersion, uniform state of the metal, as well as its stability during catalysis.

A new family of Pt LCSCs are disclosed herein using —COOH-based ligands: TMA, TPA, and BTA. Pt exists principally as highly dispersed, coordinated cations on the catalysts, proved by XPS, TEM and IR, and exhibit high activity and selectivity for alkene hydrosilylation under mild conditions. First, TMA was used to modify $CeO_2$ support, offering anchoring sites for Pt-DPTZ complexes to tackle the reported active site leaching problem. After activation in the first batch, Pt-DPTZ/TMA-$CeO_2$ exhibits steady activity through multiple batches without deactivation, a significant improvement from the previously studied Pt-DPTZ/$CeO_2$ catalyst. The chemical state of on-surface Pt does not change during catalysis. Second, —COOH-based ligands were employed to coordinate with Pt directly. Pt-TMA/$CeO_2$ offers activity exceeding any other Pt LCSCs by far, showing high turnover rate at 40° C. TPA creates dispersed $Pt^{2+}$ with highly uniform oxidation states and high aggregation resistance during catalysis. The main challenge these catalysts face is deactivation caused by active site leaching, and, in the case of Pt-BTA/$CeO_2$, on-surface Pt reduction, a result of complete weak ligand adsorption. By further exploring the vast ligand space beyond bidentate N-ligands, this work enhances the durability and activity of highly-dispersed heterogeneous Pt catalysts. Additionally, the comparison between —COOH and bidentate-N ligands highlights the ligand effects in LCSCs, providing important understandings that instruct how ligand design could be used to steer catalytic performance of LCSCs

REFERENCES

[1] L. Sommer, E. Pietrusza, F. Whitmore, Peroxide-catalyzed addition of trichlorosilane to 1-octene, J. Am. Chem. Soc., 69 (1947) 188-188.

[2] O. R. Pierce, Y. K. Kim, Fluorosilicones as high temperature elastomers, Rubber Chem. Technol., 44 (1971) 1350-1362.

[3] B. Marciniec, E. Walczuk, P. Blazejewska-Chadyniak, D. Chadyniak, M. Kujawa-Welten, S. Krompiec, N. Auner, J. Weiss, Organosilicon Chemistry V—From Molecules to Materials, Wiley VCH, Weinheim, (2003).

[4] Y. Morita, S. Tajima, H. Suzuki, H. Sugino, Thermally initiated cationic polymerization and properties of epoxy siloxane, J. Appl. Polym. Sci., 100 (2006) 2010-2019.

[5] E. Beyou, P. Babin, B. Bennetau, J. Dunogues, D. Teyssie, S. Boileau, New fluorinated polysiloxanes containing an ester function in the spacer. I. Synthesis and characterization, J. Polym. Sci., Part A: Polym. Chem., 32 (1994) 1673-1681.

[6] C. Iojoiu, M. J. Abadie, V. Harabagiu, M. Pinteala, B. C. Simionescu, Synthesis and photocrosslinking of benzyl acrylate substituted polydimethylsiloxanes, Eur. Polym. J., 36 (2000) 2115-2123.

[7] Z. Li, J. Qin, Z. Yang, C. Ye, Synthesis and structural characterization of a new polysiloxane with second-order nonlinear optical effect, J. Appl. Polym. Sci., 94 (2004) 769-774.

[8] A. Sellinger, R. M. Laine, V. Chu, C. Viney, Palladium- and platinum-catalyzed coupling reactions of allyloxy aromatics with hydridosilanes and hydridosiloxanes: Novel liquid crystalline/organosilane materials, J. Polym. Sci., Part A: Polym. Chem., 32 (1994) 3069-3089.

[9] D. B. Drazkowski, A. Lee, T. S. Haddad, D. J. Cookson, Chemical substituent effects on morphological transitions in styrene-butadiene-styrene triblock copolymer grafted with polyhedral oligomeric silsesquioxanes, Macromolecules, 39 (2006) 1854-1863.

[10] A. Tuchbreiter, H. Werner, L. H. Gade, "A posteriori" modification of carbosilane dendrimers and dendrons: their activation in core and branch positions, Dalton Trans., (2005) 1394-1402.

[11] D. Troegel, J. Stohrer, Recent advances and actual challenges in late transition metal catalyzed hydrosilylation of olefins from an industrial point of view, Coord. Chem. Rev., 255 (2011) 1440-1459.

[12] P. Jerschow, Silicone elastomers, Smart Publications 2001.

[13] R. H. Morris, Asymmetric hydrogenation, transfer hydrogenation and hydrosilylation of ketones catalyzed by iron complexes, Chem. Soc. Rev., 38 (2009) 2282-2291.

[14] B. K. Langlotz, H. Wadepohl, L. H. Gade, Chiral bis (pyridylimino) isoindoles: A highly modular class of pincer ligands for enantioselective catalysis, Angew. Chem. Int. Ed., 47 (2008) 4670-4674.

[15] S. C. Bart, E. Lobkovsky, P. J. Chirik, Preparation and molecular and electronic structures of iron (0) dinitrogen and silane complexes and their application to catalytic hydrogenation and hydrosilation, J. Am. Chem. Soc., 126 (2004) 13794-13807.

[16] I. Vankelecom, P. Jacobs, Dense organic catalytic membranes for fine chemical synthesis, Catal. Today, 56 (2000) 147-157.

[17] J. L. Speier, J. A. Webster, G. H. Barnes, The addition of silicon hydrides to olefinic double bonds. Part II. The use of group VIII metal catalysts, J. Am. Chem. Soc., 79 (1957) 974-979.

[18] B. Karstedt, Platinum complexes of unsaturated siloxanes and platinum containing organopolysiloxanes, U.S. Pat. No. 3,775,452, 1973.

[19] M. Xue, J. Li, J. Peng, Y. Bai, G. Zhang, W. Xiao, G. Lai, Effect of triarylphosphane ligands on the rhodium-catalyzed hydrosilylation of alkene, Appl. Organomet. Chem., 28 (2014) 120-126.

[20] M. Igarashi, T. Matsumoto, T. Kobayashi, K. Sato, W. Ando, S. Shimada, M. Hara, H. Uchida, Ir-catalyzed hydrosilylation reaction of allyl acetate with octakis (dimethylsiloxy) octasilsesquioxane and related hydrosilanes, J. Organomet. Chem., 752 (2014) 141-146.

[21] H. Dong, Y. Jiang, H. Berke, Rhenium-mediated dehydrogenative silylation and highly regioselective hydrosilylation of nitrile substituted olefins, J. Organomet. Chem., 750 (2014) 17-22.

[22] J. Y. Wu, B. N. Stanzl, T. Ritter, A strategy for the synthesis of well-defined iron catalysts and application to regioselective diene hydrosilylation, J. Am. Chem. Soc., 132 (2010) 13214-13216.

[23] P. B. Glaser, T. D. Tilley, Catalytic hydrosilylation of alkenes by a ruthenium silylene complex. Evidence for a new hydrosilylation mechanism, J. Am. Chem. Soc., 125 (2003) 13640-13641.

[24] S. Nozakura, S. Konotsune, Cyanoethylation of Trichlorosilane. II. α-Addition, Bull. Chem. Soc. Jpn., 29 (1956) 326-331.

[25] L. Bareille, S. Becht, J. L. Cui, P. Le Gendre, C. Moise, First Titanium-Catalyzed anti-1, 4-Hydrosilylation of Dienes, Organometallics, 24 (2005) 5802-5806.

[26] S. Harder, J. Brettar, Rational Design of a Well-Defined Soluble Calcium Hydride Complex, Angew. Chem. Int. Ed., 45 (2006) 3474-3478.

[27] V. Leich, T. P. Spaniol, L. Maron, J. Okuda, Hydrosilylation catalysis by an earth alkaline metal silyl: synthe-

[28] T. Iimura, N. Akasaka, T. Iwamoto, A Dialkylsilylene-Pt(0) Complex with a DVTMS Ligand for the Catalytic Hydrosilylation of Functional Olefins, Organometallics, 35 (2016) 4071-4076.

[29] T. Galeandro-Diamant, M.-L. Zanota, R. Sayah, L. Veyre, C. Nikitine, C. de Bellefon, S. Marrot, V. Meille, C. Thieuleux, Platinum nanoparticles in suspension are as efficient as Karstedt's complex for alkene hydrosilylation, Chem. Commun., 51 (2015) 16194-16196.

[30] B. P. Chauhan, J. S. Rathore, Regioselective Synthesis of Multifunctional Hybrid Polysiloxanes Achieved by Pt-Nanocluster Catalysis, J. Am. Chem. Soc., 127 (2005) 5790-5791.

[31] Y. Bai, S. Zhang, Y. Deng, J. Peng, J. Li, Y. Hu, X. Li, G. Lai, Use of functionalized PEG with 4-aminobenzoic acid stabilized platinum nanoparticles as an efficient catalyst for the hydrosilylation of alkenes, J. Colloid Interface Sci., 394 (2013) 428-433.

[32] J. Stein, L. Lewis, Y. Gao, R. Scott, In situ determination of the active catalyst in hydrosilylation reactions using highly reactive Pt (0) catalyst precursors, J. Am. Chem. Soc., 121 (1999) 3693-3703.

[33] T. K. Meister, K. Riener, P. Gigler, J. r. Stohrer, W. A. Herrmann, F. E. Kuhn, Platinum Catalysis Revisited—Unraveling Principles of Catalytic Olefin Hydrosilylation, ACS Catal., 6 (2016) 1274-1284.

[34] I. E. Markó, S. Stérin, O. Buisine, G. Mignani, P. Branlard, B. Tinant, J.-P. Declercq, Selective and efficient platinum (0)-carbene complexes as hydrosilylation catalysts, Science, 298 (2002) 204-206.

[35] I. E. Markó, S. Sterin, O. Buisine, G. Berthon, G. Michaud, B. Tinant, J. P. Declercq, Highly Active and Selective Platinum(0)-Carbene Complexes. Efficient, Catalytic Hydrosilylation of Functionalised Olefins, Adv. Synth. Catal., 346 (2004) 1429-1434.

[36] J. C. Bernhammer, H. V. Huynh, Platinum (II) complexes with thioether-functionalized benzimidazolin-2-ylidene ligands: Synthesis, structural characterization, and application in hydroelementation reactions, Organometallics, 33 (2013) 172-180.

[37] J. J. Dunsford, K. J. Cavell, B. Kariuki, Expanded ring N-heterocyclic carbene complexes of zero valent platinum dvtms (divinyltetramethyldisiloxane): Highly efficient hydrosilylation catalysts, J. Organomet. Chem., 696 (2011) 188-194.

[38] M. A. Taige, S. Ahrens, T. Strassner, Platinum (II)-bis-(N-heterocyclic carbene) complexes: synthesis, structure and catalytic activity in the hydrosilylation of alkenes, J. Organomet. Chem., 696 (2011) 2918-2927.

[39] N. Sabourault, G. Mignani, A. Wagner, C. Mioskowski, Platinum oxide (PtO2): a potent hydrosilylation catalyst, Org. Lett., 4 (2002) 2117-2119.

[40] Y. J. Chen, S. F. Ji, W. M. Sun, W. X. Chen, J. C. Dong, J. F. Wen, J. Zhang, Z. Li, L. R. Zheng, C. Chen, Q. Peng, D. S. Wang, Y. D. Li, Discovering Partially Charged Single-Atom Pt for Enhanced Anti-Markovnikov Alkene Hydrosilylation, J. Am. Chem. Soc., 140 (2018) 7407-7410.

[41] Y. Zhu, T. Cao, C. Cao, J. Luo, W. Chen, L. Zheng, J. Dong, J. Zhang, Y. Han, Z. Li, C. Chen, Q. Peng, D. Wang, Y. Li, One-Pot Pyrolysis to N-Doped Graphene with High-Density Pt Single Atomic Sites as Heterogeneous Catalyst for Alkene Hydrosilylation, ACS Catal., 8 (2018) 10004-10011.

[42] X. Cui, K. Junge, X. Dai, C. Kreyenschulte, M.-M. Pohl, S. Wohlrab, F. Shi, A. Brückner, M. Beller, Synthesis of Single Atom Based Heterogeneous Platinum Catalysts: High Selectivity and Activity for Hydrosilylation Reactions, ACS Central Science, 3 (2017) 580-585.

[43] Z. Huang, X. Gu, Q. Cao, P. Hu, J. Hao, J. Li, X. Tang, Catalytically Active Single-Atom Sites Fabricated from Silver Particles, Angew. Chem., 124 (2012) 4274-4279.

[44] E. Fako, Z. Lodziana, N. Lopez, Comparative single atom heterogeneous catalysts (SAHCs) on different platforms: a theoretical approach, Catal. Sci. Technol., 7 (2017) 4285-4293.

[45] Y. X. Chen, Z. W. Huang, Z. Ma, J. M. Chen, X. F. Tang, Fabrication, characterization, and stability of supported single-atom catalysts, Catal. Sci. Technol., 7 (2017) 4250-4258.

[46] G. Vilé, D. Albani, M. Nachtegaal, Z. Chen, D. Dontsova, M. Antonietti, N. López, J. Pérez-Ramirez, A Stable Single-Site Palladium Catalyst for Hydrogenations, Angew. Chem. Int. Ed., 54 (2015) 11265-11269.

[47] W. Xu, B. Yu, Y. Zhang, X. Chen, G. Zhang, Z. Gao, Single-site SBA-15 supported zirconium catalysts. Synthesis, characterization and toward cyanosilylation reaction, Appl. Surf. Sci., 325 (2015) 227-234.

[48] P. Ji, K. Manna, Z. Lin, A. Urban, F. X. Greene, G. Lan, W. Lin, Single-Site Cobalt Catalysts at New Zr8 (μ2-O)8 (μ2-OH)4 Metal-Organic Framework Nodes for Highly Active Hydrogenation of Alkenes, Imines, Carbonyls, and Heterocycles, J. Am. Chem. Soc., 138 (2016) 12234-12242.

[49] N. M. Schweitzer, B. Hu, U. Das, H. Kim, J. Greeley, L. A. Curtiss, P. C. Stair, J. T. Miller, A. S. Hock, Propylene Hydrogenation and Propane Dehydrogenation by a Single-Site Zn2+ on Silica Catalyst, ACS Catal., 4 (2014) 1091-1098.

[50] H. Sohn, J. Camacho-Bunquin, R. Langeslay, P. Ignacio-de Leon, J. Niklas, O. Poluektov, C. Liu, J. Connell, D. Yang, J. Kropf, Isolated, well-defined organovanadium (III) on silica: single-site catalyst for hydrogenation of alkenes and alkynes, Chem. Commun., (2017).

[51] L. Chen, G. E. Sterbinsky, S. L. Tait, Synthesis of platinum single-site centers through metal-ligand self-assembly on powdered metal oxide supports, J. Catal., 365 (2018) 303-312.

[52] L. Chen, I. S. Ali, G. E. Sterbinsky, J. T. L. Gamler, S. E. Skrabalak, S. L. Tait, Alkene Hydrosilylation on Oxide-Supported Pt-Ligand Single-Site Catalysts, Chem Cat Chem, 11 (2019) 2843-2854.

[53] L. Chen, I. S. Ali, S. L. Tait, Bidentate N-based Ligands for Highly Reusable, Ligand-coordinated, Supported Pt Hydrosilylation Catalysts, Chem Cat Chem, Accepted Article, DOI: 10.1002/cctc.202000085.

[54] D. Skomski, C. D. Tempas, B. J. Cook, A. V. Polezhaev, K. A. Smith, K. G. Caulton, S. L. Tait, Two- and Three-Electron Oxidation of Single-Site Vanadium Centers at Surfaces by Ligand Design, J. Am. Chem. Soc., 137 (2015) 7898-7902.

[55] D. Skomski, C. D. Tempas, G. S. Bukowski, K. A. Smith, S. L. Tait, Redox-active on-surface polymerization of single-site divalent cations from pure metals by a ketone-functionalized phenanthroline, J. Chem. Phys., 142 (2015) 101913.

[56] D. Skomski, C. D. Tempas, K. A. Smith, S. L. Tait, Redox-Active On-Surface Assembly of Metal-Organic Chains with Single-Site Pt(II), J. Am. Chem. Soc., 136 (2014) 9862-9865.

[57] C. D. Tempas, D. Skomski, B. J. Cook, D. Le, K. A. Smith, T. S. Rahman, K. G. Caulton, S. L. Tait, Redox Isomeric Surface Structures Are Preferred over Odd-Electron Pt1+, Chem. Eur. J., 24 (2018) 15852-15858.

[58] C. G. Williams, M. Wang, D. Skomski, C. D. Tempas, L. L. Kesmodel, S. L. Tait, Metal-Ligand Complexation through Redox Assembly at Surfaces Characterized by Vibrational Spectroscopy, J. Phys. Chem. C, (2017).

[59] T. W. Morris, I. J. Huerfano, M. Wang, D. L. Wisman, A. C. Cabelof, N. U. Din, C. D. Tempas, D. Le, A. V. Polezhaev, T. S. Rahman, K. G. Caulton, S. L. Tait, Multi-electron Reduction Capacity and Multiple Binding Pockets in Metal-Organic Redox Assembly at Surfaces, Chemistry—A European Journal, 25 (2019) 5565-5573.

[60] L. Chen, I. S. Ali, S. L. Tait, Bidentate N-based Ligands for Highly Reusable, Ligand-coordinated, Supported Pt Hydrosilylation Catalysts, Chem Cat Chem, 12 (2020) 3576-3584.

[61] S. L. Tait, Y. Wang, G. Costantini, N. Lin, A. Baraldi, F. Esch, L. Petaccia, S. Lizzit, K. Kern, Metal-Organic Coordination Interactions in Fe-Terephthalic Acid Networks on Cu(100), J. Am. Chem. Soc., 130 (2008) 2108-2113.

[62] D. Skomski, S. Abb, S. L. Tait, Robust Surface Nano-Architecture by Alkali-Carboxylate Ionic Bonding, Journal of the American Chemical Society, 134 (2012) 14165-14171.

[63] D. Ozer, D. A. Köse, O. Şahin, N. A. Oztas, Synthesis and Characterization of Boric Acid Mediated Metal-organic Frameworks Based on Trimesic Acid and Terephthalic Acid, Journal of Molecular Structure, 1141 (2017) 261-267.

[64] S. Stepanow, T. Strunskus, M. Lingenfelder, A. Dmitriev, H. Spillmann, N. Lin, J. V. Barth, C. Wöll, K. Kern, Deprotonation-Driven Phase Transformations in Terephthalic Acid Self-Assembly on Cu(100), J. Phys. Chem. B, 108 (2004) 19392-19397.

[65] L. Chen, V. Agrawal, S. L. Tait, Sulfate promotion of selective catalytic reduction of nitric oxide by ammonia on ceria, Catal. Sci. Technol., 9 (2019) 1802-1815.

[66] F. Burns, J. Swalen, X-ray photoelectron spectroscopy of cadmium arachidate monolayers on various metal surfaces, J. Phys. Chem., 86 (1982) 5123-5127.

[67] J. Russat, Characterization of polyamic acid/polyimide films in the nanometric thickness range from spin-deposited polyamic acid, Surf. Interface Anal., 11 (1988) 414-420.

[68] E. B. Troughton, C. D. Bain, G. M. Whitesides, R. G. Nuzzo, D. L. Allara, M. D. Porter, Monolayer films prepared by the spontaneous self-assembly of symmetrical and unsymmetrical dialkyl sulfides from solution onto gold substrates: structure, properties, and reactivity of constituent functional groups, Langmuir, 4 (1988) 365-385.

[69] M. Taguchi, S. Takami, T. Adschiri, T. Nakane, K. Sato, T. Naka, Supercritical hydrothermal synthesis of hydrophilic polymer-modified water-dispersible $CeO_2$ nanoparticles, Cryst Eng Comm, 13 (2011) 2841-2848.

[70] G. Cheng, X. Huang, H. Zhang, Y. Hu, C. Kan, Preparation of P(St-co-MAA)/$CeO_2$ composite microspheres via surface carboxyl oxidation followed by in situ chemical deposition of $CeO_2$ and their catalytic application on oxidative degradation of methyl orange, RSC Adv., 4 (2014) 29042-29049.

[71] M. Taguchi, S. Takami, T. Naka, T. Adschiri, Growth Mechanism and Surface Chemical Characteristics of Dicarboxylic Acid-Modified $CeO_2$ Nanocrystals Produced in Supercritical Water: Tailor-Made Water-Soluble $CeO_2$ Nanocrystals, Cryst. Growth Des., 9 (2009) 5297-5303.

[72] J. J. Schmidt, J. A. Gardella Jr, L. Salvati Jr, Surface studies of polymer blends. 2. An ESCA and IR study of poly (methyl methacrylate)/poly (vinyl chloride) homopolymer blends, Macromolecules, 22 (1989) 4489-4495.

[73] H. Onishi, C. Egawa, T. Aruga, Y. Iwasawa, Adsorption of Na atoms and oxygen-containing molecules on MgO (100) and (111) surfaces, Surf. Sci., 191 (1987) 479-491.

[74] K. M. R. Kallury, R. F. Debono, U. J. Krull, M. Thompson, Covalent binding of amino, carboxy, and nitro-substituted aminopropyltriethoxysilanes to oxidized silicon surfaces and their interaction with octadecanamine and octadecanoic acid studied by X-ray photoelectron spectroscopy and ellipsometry, J. Adhes. Sci. Technol., 5 (1991) 801-814.

SUPPLEMENTAL REFERENCES

[S1] D. Skomski, C. D. Tempas, K. A. Smith, S. L. Tait, Redox-Active On-Surface Assembly of Metal-Organic Chains with Single-Site Pt(II), J. Am. Chem. Soc., 136 (2014) 9862-9865.

[S2] V. P. Pakharukova, I. Y. Pakharukov, V. I. Bukhtiyarov, V. N. Parmon, Alumina-supported platinum catalysts: Local atomic structure and catalytic activity for complete methane oxidation, Appl. Catal. A, 486 (2014) 12-18.

[S3] I. E. Beck, V. I. Bukhtiyarov, I. Y. Pakharukov, V. I. Zaikovsky, V. V. Kriventsov, V. N. Parmon, Platinum nanoparticles on $Al_2O_3$: Correlation between the particle size and activity in total methane oxidation, J. Catal., 268 (2009) 60-67.

[S5] L. Chen, I. S. Ali, G. E. Sterbinsky, J. T. L. Gamler, S. E. Skrabalak, S. L. Tait, Alkene Hydrosilylation on Oxide-Supported Pt-Ligand Single-Site Catalysts, Chem Cat Chem, 11 (2019) 2843-2854.

[S6] L. Chen, I. S. Ali, S. L. Tait, Bidentate N-based Ligands for Highly Reusable, Ligand-coordinated, Supported Pt Hydrosilylation Catalysts, Chem Cat Chem, Accepted Article, DOI: 10.1002/cctc.202000085.

[S7] F. Burns, J. Swalen, X-ray photoelectron spectroscopy of cadmium arachidate monolayers on various metal surfaces, J. Phys. Chem., 86 (1982) 5123-5127.

[S8] J. Russat, Characterization of polyamic acid/polyimide films in the nanometric thickness range from spin-deposited polyamic acid, Surf. Interface Anal., 11 (1988) 414-420.

[S9] E. B. Troughton, C. D. Bain, G. M. Whitesides, R. G. Nuzzo, D. L. Allara, M. D. Porter, Monolayer films prepared by the spontaneous self-assembly of symmetrical and unsymmetrical dialkyl sulfides from solution onto gold substrates: structure, properties, and reactivity of constituent functional groups, Langmuir, 4 (1988) 365-385.

[S10] J. J. Schmidt, J. A. Gardella Jr, L. Salvati Jr, Surface studies of polymer blends. 2. An ESCA and IR study of poly (methyl methacrylate)/poly (vinyl chloride) homopolymer blends, Macromolecules, 22 (1989) 4489-4495.

[S11] H. Onishi, C. Egawa, T. Aruga, Y. Iwasawa, Adsorption of Na atoms and oxygen-containing molecules on MgO(100) and (111) surfaces, Surf. Sci., 191 (1987) 479-491.

[S12] K. M. R. Kallury, R. F. Debono, U. J. Krull, M. Thompson, Covalent binding of amino, carboxy, and nitro-substituted aminopropyltriethoxysilanes to oxidized silicon surfaces and their interaction with octadecanamine and octadecanoic acid studied by X-ray photoelectron spectroscopy and ellipsometry, J. Adhes. Sci. Technol., 5 (1991) 801-814.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A supported platinum catalyst system comprising: (a) an anchoring ligand comprising a multi-carboxylic acid phenyl or biphenyl ligand, (b) a platinum metal ion, (c) a support and (d) 3,6-di-2-pyridyl-1,2,4,5-tetrazine (DPTZ).

2. The supported platinum catalyst system of claim 1, wherein the anchoring ligand multi-carboxylic acid phenyl or biphenyl ligand has at least two carboxylic acid groups.

3. The supported platinum catalyst system of claim 2, wherein the at least two carboxylic acid groups are positioned meta or para to each other about the phenyl or biphenyl ring.

4. The supported platinum catalyst of claim 1, wherein the anchoring ligand multi-carboxylic acid phenyl or biphenyl ligand comprises one of the formulae:

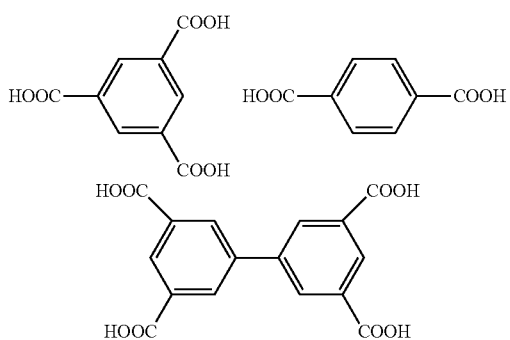

or mixtures thereof.

5. The supported platinum catalyst system of claim 1, wherein the support comprises MgO, Al$_2$O$_3$, CeO$_2$ or mixtures thereof.

6. A process comprising:
(a) providing a supported catalyst system of claim 5;
(b) contacting the supported catalyst system, a vinyl terminated alkene and a hydrosilylation agent under hydrosilylation conditions; and
(c) hydrosilylating the vinyl terminated alkene to form a hydrosilylated alkyl product.

7. The process of claim 6, wherein the vinyl terminated alkene is 1-octene.

8. The process of claim 6, wherein the hydrosilylation agent comprises dimethoxymethylsilane.

9. The supported platinum catalyst of claim 1, wherein the multi-carboxylic acid phenyl or biphenyl ligand comprises one of the formulae:

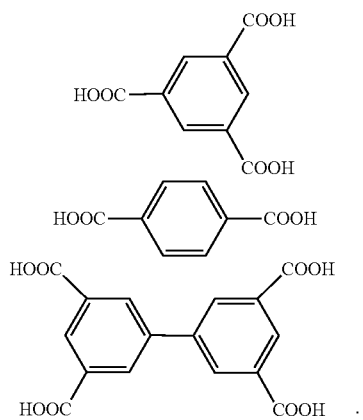

10. The supported platinum catalyst system of claim 9, wherein the support comprises MgO.

11. The supported platinum catalyst system of claim 9, wherein the support comprises Al$_2$O$_3$.

12. The supported platinum catalyst system of claim 9, wherein the support comprises CeO$_2$.

13. The supported platinum catalyst system of claim 9, wherein the support comprises one or more of MgO, Al$_2$O$_3$, or CeO$_2$.

14. The supported platinum catalyst of claim 1, wherein the multi-carboxylic acid phenyl or biphenyl ligand comprises

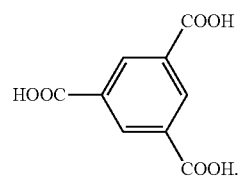 [SMILES: O=C(O)c1cc(C(=O)O)cc(C(=O)O)c1]

15. The supported platinum catalyst of claim 1, wherein the multi-carboxylic acid phenyl or biphenyl ligand comprises:

16. The supported platinum catalyst of claim 1, wherein the multi-carboxylic acid phenyl or biphenyl ligand comprises:

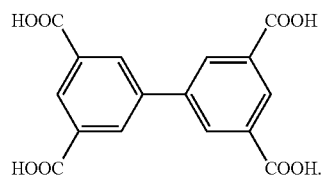 [SMILES: O=C(O)c1cc(C(=O)O)cc(-c2cc(C(=O)O)cc(C(=O)O)c2)c1]

17. The supported platinum catalyst of claim 1, wherein the multi-carboxylic acid phenyl or biphenyl ligand comprises a mixture of:

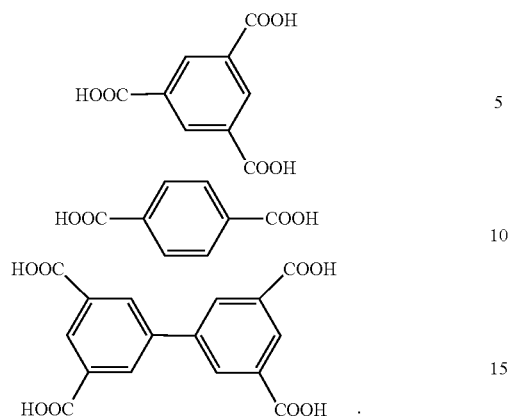
18. The supported platinum catalyst system of claim 1, wherein the support comprises MgO.
19. The supported platinum catalyst system of claim 1, wherein the support comprises $Al_2O_3$.
20. The supported platinum catalyst system of claim 1, wherein the support comprises $CeO_2$.
* * * * *